US009830294B2

(12) United States Patent
Mathewson et al.

(10) Patent No.: US 9,830,294 B2
(45) Date of Patent: Nov. 28, 2017

(54) DATA PROCESSING SYSTEM AND METHOD FOR HANDLING MULTIPLE TRANSACTIONS USING A MULTI-TRANSACTION REQUEST

(71) Applicant: ARM Limited, Cambridge (GB)

(72) Inventors: Bruce James Mathewson, Cambridge (GB); Daren Croxford, Cambridge (GB); Jason Parker, Sheffield (GB)

(73) Assignee: ARM Limited, Cambridge (GB)

( * ) Notice: Subject to any disclaimer, the term of this patent is extended or adjusted under 35 U.S.C. 154(b) by 313 days.

(21) Appl. No.: 14/579,316

(22) Filed: Dec. 22, 2014

(65) Prior Publication Data

US 2015/0199290 A1    Jul. 16, 2015

(30) Foreign Application Priority Data

Jan. 13, 2014  (GB) .................................. 1400503.7

(51) Int. Cl.
    G06F 13/00    (2006.01)
    G06F 13/40    (2006.01)
    (Continued)

(52) U.S. Cl.
    CPC ...... *G06F 13/4068* (2013.01); *G06F 12/0831* (2013.01); *G06F 13/364* (2013.01);
    (Continued)

(58) Field of Classification Search
    USPC ................................. 710/104–110, 305–317
    See application file for complete search history.

(56) References Cited

U.S. PATENT DOCUMENTS 6,981,088 B2   12/2005   Holm et al.
7,020,737 B2    3/2006   Imondi et al.
(Continued)

FOREIGN PATENT DOCUMENTS

EP    WO 00/25317    5/2000
EP    2042999         4/2009
(Continued)

OTHER PUBLICATIONS

International Search Report and Written Opinion of the International Searching Authority dated May 18, 2015 in PCT/GB2015/050009, 11 pages.
(Continued)

*Primary Examiner* — Raymond Phan
(74) *Attorney, Agent, or Firm* — Nixon & Vanderhye P.C.

(57) ABSTRACT

A data processing system having a master device and a plurality of slave devices uses interconnect circuitry to couple the master device with the plurality of slave devices to enable transactions to be performed by the slave devices upon request from the master device. The master device issues a multi-transaction request identifying multiple transactions to be performed, the multi-transaction request providing a base transaction identifier, a quantity indication indicating a number of transactions to be performed, and address information. Request distribution circuitry within the interconnect circuitry analyses the address information and the quantity indication in order to determine, for each of the multiple transactions, the slave device that is required to perform that transaction. Transaction requests are then issued from the request distribution circuitry to each determined slave device to identify which transactions need to be performed by each slave device. Each determined slave device provides a response to the master device to identify completion of each transaction performed by that deter-
(Continued)

mined slave device. Each determined slave device provides its responses independently of the responses from any other determined slave device, and each response includes a transaction identifier determined from the base transaction identifier and transaction specific information. This enables the master device to identify completion of each transaction identified within the multi-transaction request. In an alternative arrangement, the same multi-transaction request approach can be used by a master device to initiate cache maintenance operations within a plurality of cache storage devices. This approach can give rise to significant improvements in efficiency and power consumption within the data processing system.

28 Claims, 15 Drawing Sheets

(51) Int. Cl.
*G06F 13/364* (2006.01)
*G06F 13/42* (2006.01)
*G06F 12/0831* (2016.01)

(52) U.S. Cl.
CPC ...... *G06F 13/4022* (2013.01); *G06F 13/4221* (2013.01); *G06F 2212/1016* (2013.01); *Y02B 60/1225* (2013.01); *Y02B 60/1228* (2013.01); *Y02B 60/1235* (2013.01)

(56) References Cited

U.S. PATENT DOCUMENTS

| | | | |
|---|---|---|---|
| 7,159,084 | B1 | 1/2007 | Dhanoa |
| 7,558,895 | B2 * | 7/2009 | Bruce ................... G06F 13/364 710/110 |
| 7,716,442 | B2 | 5/2010 | Herczog |
| 2003/0200397 | A1 | 10/2003 | McAllister et al. |
| 2005/0253858 | A1 | 11/2005 | Ohkami et al. |
| 2008/0040523 | A1 | 2/2008 | Bruce |
| 2008/0313365 | A1 | 12/2008 | Bruce |
| 2010/0042759 | A1 | 2/2010 | Srinivasan et al. |
| 2011/0107345 | A1 | 5/2011 | Al-Kadi et al. |
| 2012/0036509 | A1 | 2/2012 | Srinivasan et al. |
| 2012/0290752 | A1 | 11/2012 | Lim |
| 2013/0318308 | A1 | 11/2013 | Jayasimha et al. |

FOREIGN PATENT DOCUMENTS

| | | |
|---|---|---|
| GB | 2 440 758 | 2/2008 |
| KR | 20060130727 | 12/2006 |
| WO | WO 2005088920 | 9/2005 |
| WO | WO 2007/004159 | 1/2007 |

OTHER PUBLICATIONS

Search Report for GB1400503.7, dated Jun. 18, 2014, 3 pages.
Search Report for GB1400503.7, dated Sep. 3, 2014, 2 pages.
S. Osborne et al., "Bus Encoding Architecture for Low-Power Implementation of an AMBA-based SoC Platform", IEE Proceedings—Computers and Digital Techniques, vol. 149, No. 4, Jul. 2002, 5 pages.

* cited by examiner

DATA PROCESSING SYSTEM AND METHOD FOR HANDLING MULTIPLE TRANSACTIONS USING A MULTI-TRANSACTION REQUEST

This application claims priority to GB 1400503.7 filed 13 Jan. 2014, the entire contents of which is hereby incorporated by reference.

FIELD

The present technique relates to a data processing system and method for handling multiple transactions.

BACKGROUND

In modern data processing systems, it is becoming more and more important to make most efficient use of the available memory bandwidth. For example, in System on Chips (SoCs), there are various master devices such as graphics processing units (GPUs) and display controllers that can issue transactions involving the writing or reading of significant quantities of data. It is known to issue transactions as burst transactions, consisting of a plurality of beats, with a certain amount of data being written to memory, or read from memory, during each beat. Such burst transactions can make very efficient use of memory bandwidth. However, there is a limitation that any particular transaction has to be processed by a particular slave device. In modern systems, multiple memory devices may be provided within, or connected to, the SoC, and data may be interleaved amongst those various devices, and this can limit the amount of data that can be addressed by any particular transaction.

In addition, modern SoCs typically include multiple master devices, each of which may contain one or more levels of cache. This gives rise to cache coherency issues, and typically the interconnect circuitry interconnecting the various master devices and slave devices includes cache coherency circuitry (for example snoop circuitry) to ensure that the cache contents are kept coherent, and that accordingly each master device will access up-to-date data. At the time a transaction is issued, then assuming that transaction specifies an address which is cacheable, it will not be known at the time the transaction is issued whether the data at that address is cached or not. It will hence not be known whether the data will be accessed in the cache, or in memory. Typically this limits the amount of data addressed by any particular transaction to not exceed the size of a cache line, hence ensuring that any particular transaction can be serviced by an access to the cache if that data resides in the cache. For burst transactions, this hence limits the overall size of the burst. Whilst such an approach ensures that cache coherency can be maintained in a simple and effective manner, it reduces the efficient use of the available memory bandwidth due to the need to handle multiple smaller burst transactions. The use of such smaller bursts also increases the power consumption within the interconnect circuitry, and can reduce the re-ordering capabilities of memory controllers due to effectively reducing visibility of future transactions in their re-ordering queues, therefore reducing memory efficiency.

US 2010/0042759 provides a mechanism for allowing two or more memory devices to be treated as a single aggregate target. As a result, a master device can issue a transaction to that single aggregate target, allowing a larger burst transaction to be specified. The single transaction is then split up for sending to the various slave devices. However, the results then need to be recombined so that they can be returned to the master from the single aggregate target to which the original transaction was directed. This gives rise to complexity in coordinating the results.

The above described problems associated with the efficient handling of transactions between master and slave devices in a SoC can also occur for other types of transactions issued within the SoC. For example, a master device may issue transactions to interconnect circuitry that identify cache maintenance operations to be performed in respect of a plurality of cache storage devices within the SoC. Since it may not be known which particular cache storage device or cache storage devices need to implement the cache maintenance operation at the time the associated transaction is issued to the interconnect circuitry, it is typical to limit each transaction to address a single cache line of data. Hence, it is typically necessary to issue multiple separate transactions in order to perform cache maintenance operations in respect of multiple cache lines. This tends to increase the power consumption within the interconnect.

It would accordingly be desirable to provide an improved mechanism for handling transactions within a data processing system.

SUMMARY

Viewed from a first aspect, there is provided a data processing system comprising: a master device; a plurality of slave devices; interconnect circuitry configured to couple the master device with said plurality of slave devices to enable transactions to be performed by said plurality of slave devices upon request from the master device; the master device being configured to issue a multi-transaction request identifying multiple transactions to be performed, the multi-transaction request providing a base transaction identifier, a quantity indication indicating a number of transactions to be performed, and address information; the interconnect circuitry including request distribution circuitry configured to analyse the address information and the quantity indication in order to determine, for each of the multiple transactions, the slave device that is required to perform that transaction, and further configured to issue transaction requests to each determined slave device to identify the transactions amongst said multiple transactions to be performed by that determined slave device; each determined slave device being configured to provide a response to the master device to identify completion of each transaction performed by that determined slave device, each determined slave device being configured to provide its responses independently of the responses from any other determined slave device, and each response including a transaction identifier determined from the base transaction identifier and transaction specific information to enable the master device to identify completion of each transaction identified within the multi-transaction request.

Viewed from a second aspect, there is provided interconnect circuitry for interconnecting a master device and a plurality of slave devices to enable transactions to be performed by said plurality of slave devices upon request from the master device, comprising: a master interface configured to receive from the master device a multi-transaction request identifying multiple transactions to be performed, the multi-transaction request providing a base transaction identifier, a quantity indication indicating a number of transactions to be performed, and address information; request distribution circuitry configured to analyse the address information and the quantity indication in order to determine, for each of the multiple transactions, the slave device that is required to perform that transaction, and further configured to issue transaction requests to each determined slave device to identify the transactions amongst said multiple transactions to be performed by that determined slave device; and response routing circuitry configured to route to the master device a response provided from each determined slave device to identify completion of each transaction performed by that determined slave device, each determined slave device providing its responses independently of the responses from any other determined slave device, and each response including a transaction identifier determined from the base transaction identifier and transaction specific information to enable the master device to identify completion of each transaction identified within the multi-transaction request.

Viewed from a third aspect, there is provided a method of performing transactions within a data processing system comprising a master device, a plurality of slave devices, and interconnect circuitry coupling the master device with said plurality of slave devices to enable said transactions to be performed by said plurality of slave devices upon request from the master device, the method comprising: issuing from the master device a multi-transaction request identifying multiple transactions to be performed, the multi-transaction request providing a base transaction identifier, a quantity indication indicating a number of transactions to be performed, and address information; analysing within the interconnect circuitry the address information and the quantity indication in order to determine, for each of the multiple transactions, the slave device that is required to perform that transaction, and issuing transaction requests to each determined slave device to identify the transactions amongst said multiple transactions to be performed by that determined slave device; and issuing to the master device from each determined slave device a response to identify completion of each transaction performed by that determined slave device, each determined slave device providing its responses independently of the responses from any other determined slave device, and each response including a transaction identifier determined from the base transaction identifier and transaction specific information to enable the master device to identify completion of each transaction identified within the multi-transaction request.

Viewed from a fourth aspect, there is provided a data processing system comprising: a master means; a plurality of slave means; interconnect means for coupling the master means with said plurality of slave means to enable transactions to be performed by said plurality of slave means upon request from the master means; the master means for issuing a multi-transaction request identifying multiple transactions to be performed, the multi-transaction request providing a base transaction identifier, a quantity indication indicating a number of transactions to be performed, and address information; the interconnect means including request distribution means for analysing the address information and the quantity indication in order to determine, for each of the multiple transactions, the slave means that is required to perform that transaction, and further for issuing transaction requests to each determined slave means to identify the transactions amongst said multiple transactions to be performed by that determined slave means; each determined slave means for providing a response to the master means to identify completion of each transaction performed by that determined slave means, each determined slave means for providing its responses independently of the responses from any other determined slave means, and each response including a transaction identifier determined from the base transaction identifier and transaction specific information to enable the master means to identify completion of each transaction identified within the multi-transaction request.

Viewed from a further aspect, there is provided a data processing system, comprising: a master device; a plurality of cache storage devices; interconnect circuitry configured to couple the master device with said plurality of cache storage devices to enable cache maintenance operations specified by the master device to be performed by the plurality of cache storage devices; the master device being configured to issue a multi-transaction request identifying multiple transactions to be performed, and the multi-transaction request providing a quantity indication indicating a number of transactions to be performed, and address information, each of the multiple transactions specifying a cache maintenance operation to be performed at an address associated with that transaction; the interconnect circuitry including request distribution circuitry configured to analyse the address information and the quantity indication in order to determine, for each of the multiple transactions, which of said plurality of cache storage devices are required to perform that transaction, and further configured to issue transaction requests to each of the plurality of cache storage devices to identify the transactions amongst said multiple transactions to be performed by each of the plurality of cache storage devices; and cache maintenance tracking circuitry configured to receive progress indications from the plurality of cache storage devices during performance of said multiple transactions, and to provide progress information to the master device to enable the master device to determine when said multiple transactions have been completed.

Viewed from a further aspect, there is provided interconnect circuitry for interconnecting a master device and a plurality of cache storage devices to enable cache maintenance operations specified by the master device to be performed by the plurality of cache storage devices, the interconnect circuitry comprising: a master interface configured to receive from the master device a multi-transaction request identifying multiple transactions to be performed, the multi-transaction request providing a quantity indication indicating a number of transactions to be performed, and address information, each of the multiple transactions specifying a cache maintenance operation to be performed at an address associated with that transaction; request distribution circuitry configured to analyse the address information and the quantity indication in order to determine, for each of the multiple transactions, which of said plurality of cache storage devices are required to perform that transaction, and further configured to issue transaction requests to each of the plurality of cache storage devices to identify the transactions amongst said multiple transactions to be performed by each of the plurality of cache storage devices; and cache maintenance tracking circuitry configured to receive progress indications from the plurality of cache storage devices during performance of said multiple transactions, and to provide progress information to the master device to enable the master device to determine when said multiple transactions have been completed.

Viewed from a further aspect, there is provided a method of performing cache maintenance operations within a data processing system comprising a master device, a plurality of cache storage devices, and interconnect circuitry coupling the master device with said plurality of cache storage devices to enable said cache maintenance operations specified by the master device to be performed by the plurality of cache storage devices, the method comprising: issuing from the master device a multi-transaction request identifying multiple transactions to be performed, the multi-transaction request providing a quantity indication indicating a number of transactions to be performed, and address information, each of the multiple transactions specifying a cache maintenance operation to be performed at an address associated with that transaction; analysing within the interconnect circuitry the address information and the quantity indication in order to determine, for each of the multiple transactions, which of said plurality of cache storage devices are required to perform that transaction, and issuing transaction requests to each of the plurality of cache storage devices to identify the transactions amongst said multiple transactions to be performed by each of the plurality of cache storage devices; and receiving within the interconnect circuitry progress indications from the plurality of cache storage devices during performance of said multiple transactions, and providing progress information to the master device to enable the master device to determine when said multiple transactions have been completed.

Viewed from a yet further aspect, there is provided a data processing system, comprising: a master means; a plurality of cache storage means; interconnect means for coupling the master means with said plurality of cache storage means to enable cache maintenance operations specified by the master means to be performed by the plurality of cache storage means; the master means for issuing a multi-transaction request identifying multiple transactions to be performed, and the multi-transaction request providing a quantity indication indicating a number of transactions to be performed, and address information, each of the multiple transactions specifying a cache maintenance operation to be performed at an address associated with that transaction; the interconnect means including request distribution means for analysing the address information and the quantity indication in order to determine, for each of the multiple transactions, which of said plurality of cache storage means are required to perform that transaction, and further for issuing transaction requests to each of the plurality of cache storage means to identify the transactions amongst said multiple transactions to be performed by each of the plurality of cache storage means; and cache maintenance tracking means for receiving progress indications from the plurality of cache storage means during performance of said multiple transactions, and for providing progress information to the master means to enable the master means to determine when said multiple transactions have been completed.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
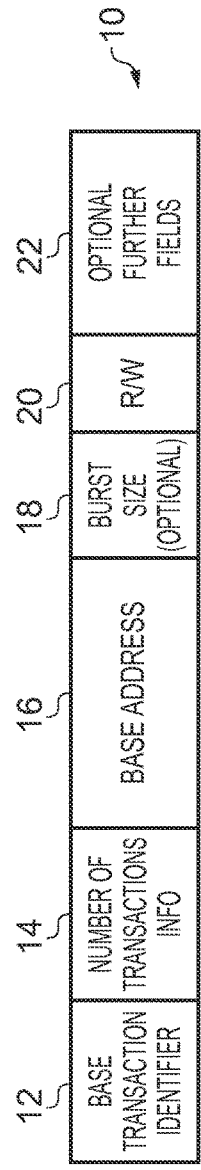
FIG. 1A schematically illustrates a multi-transaction request in accordance with one embodiment.
FIG. 1B illustrates alternative formats for the number of transactions information included within the multi-transaction request in accordance with one embodiment.

Before discussing the embodiments with reference to the accompanying figures, the following description of embodiments and associated advantages is provided.

In accordance with a first embodiment there is provided a data processing system comprising: a master device; a plurality of slave devices; interconnect circuitry configured to couple the master device with said plurality of slave devices to enable transactions to be performed by said plurality of slave devices upon request from the master device; the master device being configured to issue a multi-transaction request identifying multiple transactions to be performed, the multi-transaction request providing a base transaction identifier, a quantity indication indicating a number of transactions to be performed, and address information; the interconnect circuitry including request distribution circuitry configured to analyse the address information and the quantity indication in order to determine, for each of the multiple transactions, the slave device that is required to perform that transaction, and further configured to issue transaction requests to each determined slave device to identify the transactions amongst said multiple transactions to be performed by that determined slave device; each determined slave device being configured to provide a response to the master device to identify completion of each transaction performed by that determined slave device, each determined slave device being configured to provide its responses independently of the responses from any other determined slave device, and each response including a transaction identifier determined from the base transaction identifier and transaction specific information to enable the master device to identify completion of each transaction identified within the multi-transaction request.

In accordance with the above embodiment, the master device is configured to issue a multi-transaction request identifying multiple transactions to be performed. Request distribution circuitry within the interconnect circuitry then analyses the address information provided with the multi-transaction request, along with a quantity indication indicating the number of transactions to be performed, in order to determine which slave devices are required to perform each transaction. As a result of that analysis, the request distribution circuitry then issues transaction requests to the relevant slave devices identifying the transactions to be performed by those slave devices. Each slave device is then arranged to process the transactions allocated to it, and to provide a response to the master device identifying completion of each transaction. Each slave device provides its responses independently of the responses from any of the other slave devices, with each response including a transaction identifier that is determined from a base transaction identifier provided in the multi-transaction request and some transaction specific information, this enabling the master device to identify completion of each transaction identified within the multi-transaction request.

By such an approach, the request distribution circuitry can ensure that the individual transactions specified within the multi-transaction request are routed to the appropriate slave devices for processing, but without any need to coordinate the responses generated by the various slave devices. In particular, the master device is aware that whilst it has issued a single request (the multi-transaction request), that that request relates to a plurality of transactions, and the master device expects to receive responses for each transaction. These responses can hence be generated independently by each slave device along with an appropriate transaction identifier to allow the master device to determine which transaction within the multi-transaction request is being responded to.

The responses will take a variety of forms. For example, for a read transaction, one or more responses may be provided to the master device, each response identifying an item of read data. For a write transaction, a response will be sent back from the slave device to the master device to confirm that the write transaction has been actioned, for example the write data has been received by the slave device.

Because the multi-transaction request relates to a plurality of transactions, then this can give rise to efficiencies within the interconnect circuitry, and efficient use of bandwidth between the interconnect circuitry and the slave devices. For example, by analysing the plurality of transactions of the multi-transaction request, this can lead to more efficient utilisation of the resources within the interconnect circuitry. Further, where it is determined that several of the transactions can be handled by the same slave device, then the request distribution circuitry can route those multiple transactions to the slave device together, allowing better utilisation of the bandwidth between the interconnect circuitry and the slave device. Further, by giving the slave device knowledge of those multiple transactions to be performed, the slave device may be able to process the transactions more efficiently. As a particular example, the slave device may be a memory controller used to control access to DRAM memory. It is more efficient to access multiple items of data within the same open page of memory, and by receiving and handling multiple transactions at the same time, the memory controller may be able to process that series of transactions more efficiently than if it had had to handle those various transactions separately. The slave device can then still send responses to the master device identifying completion of each transaction, enabling the master device to determine when each transaction has been processed.

There are a number of ways in which the request distribution circuitry can issue transaction requests to each determined slave device. In one embodiment, the transaction requests issued by the request distribution circuitry include at least one multi-transaction request, each of said at least one multi-transaction requests identifying a plurality of said multiple transactions that are required to be performed by the determined slave device to which that multi-transaction request is issued. By such an approach, an individual slave device can receive notification about a plurality of transactions that it is to process, enabling the slave device to arrange the handling of those transactions so as to optimise efficiency. As a particular example, if the request distribution circuitry determines that a particular sequence of the transactions in the multi-transaction request do not need to be subjected to any snooping/cache coherency operations, and that all of the transactions in that sequence are to be serviced by a particular slave device, then a multi-transaction request can be issued to that slave device identifying those sequence of transactions. Often, the slave device will then be able to process those transactions more efficiently as a result of being aware of the entire sequence of transactions to be performed, when compared with having received those individual transactions in a piecemeal manner and having processed them separately.

The multi-transaction request can take a variety of forms. However, in one embodiment the multi-transaction request issued by the master device is a multi-burst transaction request, and each of said multiple transactions is a burst transaction specifying a plurality of data transfers to be performed between the master device and the determined slave device for that burst transaction.

The address information can take a variety of forms but in one embodiment comprises a base address, and the address for each transaction identified by the multi-transaction request is determined with reference to the base address. Hence, the individual addresses associated with each transaction can be determined with reference to the base address.

In one embodiment, each multi-transaction request identifies a series of transactions relating to predetermined addresses within a contiguous address range. Hence, purely by way of example, if each transaction is a burst transaction identifying a certain number of bytes of data, then the addresses may be identified so as to specify adjacent blocks of data, with each block the subject of a separate burst transaction within the series of transactions specified by the multi-transaction request.

In an alternative embodiment there is no requirement for the series of transactions to relate to predetermined addresses within a contiguous address range. For example, in one embodiment the multi-transaction request comprises mask information which is used in combination with the base address to determine the address for each transaction identified by the multi-transaction request. In one embodiment, the mask information can take the form of a bitwise field, which can for example be used to identify which of a series of adjacent blocks of data are to be subjected to each transaction. For example, a bit wise field of "1011" may identify that the first, second and fourth data blocks should be processed by a series of three transactions within the multi-transaction request.

The transaction specific information which is combined with the base transaction identifier in order to form a transaction identifier for each response returned to the master device can take a variety of forms. However, in one embodiment, when a slave device provides a response for a particular transaction, the transaction specific information used in combination with the base transaction identifier by that slave device to generate the transaction identifier included in the response comprises a number of bits of the address specified for the transaction. For example, a certain number of low order bits of the address may be used to uniquely identify each transaction when combined with the base transaction identifier.

In one embodiment, the data processing system further comprises at least one further master device having a cache storage in which data is cached for access by that at least one further master device. As a result, cache coherency issues can arise within the data processing system, and the request distribution circuitry is arranged to take that into account when deciding how to distribute the various transactions specified by the multi-transaction request. In particular, in one embodiment the interconnect circuitry comprises snoop circuitry responsive to a received transaction request to perform a snoop operation in respect of said cache storage based on an address specified for the transaction associated with the received transaction request, in order to determine whether data at that address is stored within the cache storage. The request distribution circuitry is further configured to analyse the address information and the quantity indication in order to determine whether any of the multiple transactions specify an address which requires a snoop operation to be performed by the snoop circuitry, and is responsive to determining that at least one of the multiple transactions requires a snoop operation to be performed, to split the multi-transaction request received from the master device into a plurality of transaction requests, and to issue at least one of the transaction requests to the snoop circuitry. Depending on the responses received from the snoop circuitry as a result of the snoop operations it performs, it may be possible to issue a response directly to the master device for the relevant transactions, or instead it may be necessary to route those transactions on to one of the slave devices for handling.

In one embodiment, at least one of the transaction requests issued to the snoop circuitry comprises a multi-transaction request identifying a plurality of said multiple transactions for which a snoop operation is required to be performed. By being advised of multiple transactions that require handling by the snoop circuitry, the snoop circuitry may be able to perform the snoop operations more efficiently, for example by performing less lookups within any associated snoop filter, and/or issuing snoop requests to the cache storage that identify multiple cache lines to be snooped.

The snoop circuitry can take a variety of forms, but in one embodiment comprises a plurality of snoop circuits, each snoop circuit being associated with a different address range, and the request distribution circuitry being configured to issue separate transaction requests to each snoop circuit. By providing multiple snoop circuits, snooping operations can be performed in parallel for different address ranges, thereby improving efficiency. Further, multi-transaction requests can be issued to each snoop circuit, providing further efficiency benefits.

In one embodiment, the snoop circuitry may automatically issue snoop requests to each cache on receipt of a transaction request from the request distribution circuitry. However, in an alternative embodiment, the snoop circuitry may comprise a snoop filter configured to maintain address indications of addresses for which data is stored in the cache storage, and the snoop operation performed for a transaction comprises referencing the snoop filter using the address specified by the transaction, and issuing a snoop request to the cache storage if the snoop filter indicates that the address matches one of the address indications maintained by the snoop filter. Such an approach can reduce the number of snoop requests that need to be issued to the cache storage.

Further, when handling a multi-transaction request, the snoop circuitry may be able to reduce the number of lookups required in the snoop filter based on the knowledge of the multiple transactions identified within the multi-transaction request. For example, each entry in the snoop filter may be configured to store a slightly shorter than normal tag portion that hence matches multiple cache lines, and for each of those cache lines the entry can be configured to store information identifying which caches need to be snooped in the event of a match being detected for that entry. A single lookup can then be performed in respect of each entry, and in the event that the corresponding shortened tag portion of the transaction matches the tag portion stored in an entry of the snoop filter, then the relevant information stored in that entry can be used to identify which caches need to be snooped in respect of the associated cache lines. By being able to associate multiple cache lines with a single entry, this can significantly improve the efficiency of the access to the snoop filter by reducing the number of lookups required in order to process the full range of addresses covered by the multi-transaction request.

The plurality of slave devices can take a variety of forms, but in one embodiment include a plurality of memory controllers coupled to associated memory devices.

In one embodiment, each associated memory device is configured to store data associated with a pattern of addresses, the pattern of addresses of one memory device being interleaved with the pattern of addresses of another memory device. The request distribution circuitry is configured to split the multi-burst transaction request into separate multi-burst transaction requests to be issued to each memory controller in order to cause each memory controller to perform the transactions amongst said multiple transactions whose specified addresses are within the pattern of addresses of the associated memory device. Each memory controller can then handle the various transactions identified in its received multi-burst transaction request independently of the transactions handled by any of the other memory controllers, with each memory controller sending responses back to the master device to indicate completion of each transaction it has processed. By receiving a multi-burst transaction request, the memory controller will have sight of multiple transactions that it is required to perform, and can accordingly schedule its accesses to the associated memory device so as to optimise efficiency in the handling of the various accesses required by those multiple transactions.

There are a number of ways in which each memory controller can determine the transactions that it needs to perform. For example, in one embodiment each memory controller may be provided with control data used by the memory controller to identify which transactions require performing by that memory controller. In particular, the manner in which addresses are interleaved between the various memory devices is typically defined statically, and accordingly that information can be provided to the memory controller. It can then receive the full original multi-burst transaction request as issued by the master device and determine from the control data which of the individual transactions within that multi-burst transaction request it should process. It will then send responses back to the master device for each transaction that it processes. Assuming the multi-burst transaction request is routed to all of the relevant memory controllers this will ensure that all of the transactions are performed, and that the master device is notified concerning the completion of each transaction within the multi-burst transaction request.

As an alternative, the request distribution circuitry may encode the control data into the multi-transaction request issued to each memory controller. Accordingly, each memory controller will receive a slightly modified multi-transaction request, with the control data being specific to the memory controller that that multi-transaction request is issued to. This control data can take a variety of forms, but in one embodiment may take the form of some mask data used to identify the particular subset of transactions to be handled by the recipient memory controller.

As discussed earlier, the transactions specified within the multi-transaction request may be read transactions or write transactions. In the event that they are write transactions, then there will typically be a significant amount of write data that will need routing to the various slave devices in order to enable each write transaction specified by the multi-transaction request to be performed. This could potentially lead to congestion within write data routing circuitry of the interconnect circuitry, which could reduce the efficiency of operation of the interconnect circuitry. However, in one embodiment such potential for congestion is alleviated by deferring the transmission of the items of write data until they are required by the various slave devices. In particular, in one embodiment, the multi-transaction request issued by the master device identifies multiple write transactions requiring write data to be written from the master device to the determined slave device for each write transaction, the interconnect circuitry includes write data routing circuitry configured to route the write data for each of the multiple write transactions to the determined slave device for each write transaction, and the master device is configured to delay output of the write data through the write data routing circuitry for each transaction until the determined slave device for that transaction issues a request for the write data.

There are various ways in which the slave device could issue a request for the write data. In one embodiment, the data processing system further comprises a handshake mechanism between each determined slave device and the master device via which each determined slave device issues the request for the write data. Hence, the master device will only output each item of write data when it is requested by the slave device via the handshake mechanism.

In an alternative embodiment, the master device comprises a cache storage in which said write data is stored, and the request for the write data issued by the determined slave device is configured to cause the required write data to be evicted from the cache storage. Hence, in such an embodiment, the write data is stored in the cache and is caused to be evicted from the cache as and when needed by the relevant slave device. There are a number of ways in which the data could be caused to be evicted from the cache storage. For example, the slave device may be arranged to issue a snoop request to snoop circuitry within the interconnect circuitry to cause the eviction to take place.

In one embodiment, the interconnect circuitry further comprises response routing circuitry configured to route to the master device the responses issued by each slave device during performance of the multiple transactions. In accordance with one embodiment, the interconnect circuitry further comprises contention mitigation circuitry associated with the request distribution circuitry and configured on determination that the request distribution circuitry is to split the multi-transaction request into a plurality of transaction requests issued to different slave devices, to apply a contention reduction measure in respect of the plurality of transaction requests in order to seek to reduce contention within the response routing circuitry due to responses being returned through the response routing circuitry from different slave devices. In particular, since the request distribution circuitry analyses the incoming multi-transaction request relating to multiple transactions that are required, then at that point the interconnect circuitry will have some oversight as to the number of responses and sources of those responses, i.e. which slave devices will issue those various responses, and in accordance with this embodiment the interconnect circuitry includes contention mitigation circuitry which seeks to reduce contention within the response routing circuitry due to the various responses that need to be returned from the various slave devices to the master device.

There are a variety of ways in which the contention mitigation circuitry may seek to reduce contention within the response routing circuitry. For example, the contention reduction measure applied could allocate each of the slave devices different time slots within the response routing circuitry so as to avoid multiple slave devices seeking to send responses to the master device at the same time. Alternatively, or in addition, a data indication may be provided in association within each transaction request restricting a data rate employed by the determined slave device. The data indication may for example identify a maximum rate at which the slave device can return responses (for example the maximum rate for returning read data for a read transaction) or for a write transaction may specify a maximum rate at which the slave device can request write data. By throttling back the data rates that may be used, this can reduce the chances of contention occurring in the interconnect circuitry. As another possible measure that can be employed, the request distribution circuitry could stagger the onward propagation of the transaction requests to each individual slave device so as to introduce a time delay between the actioning of transactions by particular slave devices.

In one embodiment, where the multi-transaction request identifies multiple write transactions, the multi-transaction requests may include a field which identifies the write data value to be written for each transaction. This can be used for example to write logic zero values to an area of memory. Since the write data value is specified as a field of the transaction, the required write data can be generated locally by the slave device processing the transaction, and hence this can give rise to a reduction in write data congestion, and in power consumption.

The multi-transaction requests for the above-described embodiments can also be used to provide efficient memory copy functionality. For example, in one embodiment the multi-transaction request may identify multiple read transactions to be performed, and may further specify a write address indication used to identify an address at which each read data value should be written, thereby allowing data to be read from one address and then written to another address without separate write transaction requests being issued. The write address information can be specified in a variety of ways, for example by an explicit write address, or by specifying some offset value to be applied with respect to the read address of each transaction.

As an alternative mechanism for performing such memory copy operations, the master device may be configured to issue a multi-transaction read request followed by an associated multi-transaction write request, and the request distribution circuitry is configured to be responsive to the multi-transaction read request and associated multi-transaction write request to issue transaction requests to each determined slave device so as to cause data to be read from one address and then written to another address.

There are a number of ways in which the multi-transaction write request can be identified as being associated with the multi-transaction read request. For example, in one embodiment the associated multi-transaction write request is configured to specify the same base transaction identifier as used for the multi-transaction read request in order to enable the request distribution circuitry to identify the associated multi-transaction write request as being associated with the multi-transaction read request.

In accordance with a further embodiment, there is provided interconnect circuitry for interconnecting a master device and a plurality of slave devices to enable transactions to be performed by said plurality of slave devices upon request from the master device, comprising: a master interface configured to receive from the master device a multi-transaction request identifying multiple transactions to be performed, the multi-transaction request providing a base transaction identifier, a quantity indication indicating a number of transactions to be performed, and address information; request distribution circuitry configured to analyse the address information and the quantity indication in order to determine, for each of the multiple transactions, the slave device that is required to perform that transaction, and further configured to issue transaction requests to each determined slave device to identify the transactions amongst said multiple transactions to be performed by that determined slave device; and response routing circuitry configured to route to the master device a response provided from each determined slave device to identify completion of each transaction performed by that determined slave device, each determined slave device providing its responses independently of the responses from any other determined slave device, and each response including a transaction identifier determined from the base transaction identifier and transaction specific information to enable the master device to identify completion of each transaction identified within the multi-transaction request.

In accordance with a further embodiment, there is provided a method of performing transactions within a data processing system comprising a master device, a plurality of slave devices, and interconnect circuitry coupling the master device with said plurality of slave devices to enable said transactions to be performed by said plurality of slave devices upon request from the master device, the method comprising: issuing from the master device a multi-transaction request identifying multiple transactions to be performed, the multi-transaction request providing a base transaction identifier, a quantity indication indicating a number of transactions to be performed, and address information; analysing within the interconnect circuitry the address information and the quantity indication in order to determine, for each of the multiple transactions, the slave device that is required to perform that transaction, and issuing transaction requests to each determined slave device to identify the transactions amongst said multiple transactions to be performed by that determined slave device; and issuing to the master device from each determined slave device a response to identify completion of each transaction performed by that determined slave device, each determined slave device providing its responses independently of the responses from any other determined slave device, and each response including a transaction identifier determined from the base transaction identifier and transaction specific information to enable the master device to identify completion of each transaction identified within the multi-transaction request.

In accordance with a yet further embodiment, there is provided a data processing system comprising: a master means; a plurality of slave means; interconnect means for coupling the master means with said plurality of slave means to enable transactions to be performed by said plurality of slave means upon request from the master means; the master means for issuing a multi-transaction request identifying multiple transactions to be performed, the multi-transaction request providing a base transaction identifier, a quantity indication indicating a number of transactions to be performed, and address information; the interconnect means including request distribution means for analysing the address information and the quantity indication in order to determine, for each of the multiple transactions, the slave means that is required to perform that transaction, and further for issuing transaction requests to each determined slave means to identify the transactions amongst said multiple transactions to be performed by that determined slave means; each determined slave means for providing a response to the master means to identify completion of each transaction performed by that determined slave means, each determined slave means for providing its responses independently of the responses from any other determined slave means, and each response including a transaction identifier determined from the base transaction identifier and transaction specific information to enable the master means to identify completion of each transaction identified within the multi-transaction request.

The inventors realised that the multi-transaction request approach of the present technique can also be adopted in relation to transactions performed between a master device and a plurality of cache storage devices, in particular, a series of transactions specifying cache maintenance operations. In particular, in accordance with a further embodiment, there is provided a data processing system, comprising: a master device; a plurality of cache storage devices; interconnect circuitry configured to couple the master device with said plurality of cache storage devices to enable cache maintenance operations specified by the master device to be performed by the plurality of cache storage devices; the master device being configured to issue a multi-transaction request identifying multiple transactions to be performed, and the multi-transaction request providing a quantity indication indicating a number of transactions to be performed, and address information, each of the multiple transactions specifying a cache maintenance operation to be performed at an address associated with that transaction; the interconnect circuitry including request distribution circuitry configured to analyse the address information and the quantity indication in order to determine, for each of the multiple transactions, which of said plurality of cache storage devices are required to perform that transaction, and further configured to issue transaction requests to each of the plurality of cache storage devices to identify the transactions amongst said multiple transactions to be performed by each of the plurality of cache storage devices; and cache maintenance tracking circuitry configured to receive progress indications from the plurality of cache storage devices during performance of said multiple transactions, and to provide progress information to the master device to enable the master device to determine when said multiple transactions have been completed.

In accordance with this example embodiment, request distribution circuitry within the interconnect circuitry is able to determine which of the plurality of cache storage devices are required to perform each of the transactions specified in the multi-transaction request, and to then issue transaction requests to each of the plurality of cache storage devices to identify the transactions that each storage device is required to perform. Each cache storage device can then perform its required cache maintenance operations, with cache maintenance tracking circuitry being used to receive the progress indications back from those cache storage devices and to then provide progress information to the master device. Through use of the multi-transaction request approach, a whole series of cache maintenance operations can be specified at one time, while the request distribution circuitry can then ensure that each individual cache storage device actions the appropriate cache maintenance operations. Whilst certain cache maintenance operations may only need to be actioned by a single cache, others may need to be performed within a plurality of cache storage devices, and in that instance the cache maintenance tracking circuitry can use the progress indications from the various cache storage devices to determine when each cache maintenance operation has been completed, and to advise the master device accordingly.

The master device is not required to have any knowledge of which cache storage devices need to process each individual transaction/cache maintenance operation, and merely uses the progress information provided from the cache maintenance tracking circuitry to determine when the various multiple transactions have been completed. From the point of view of the master device, it does not matter in what order the various transactions/cache maintenance operations are performed, and accordingly, this allows the various cache storage devices to optimise their behaviour to perform the various cache maintenance operation in as efficient a manner as possible. For example, it may be possible to reduce the number of lookups required within tag portions of the cache storage devices when performing certain cache maintenance operations, in situations where an individual cache storage device receives a multi-transaction request specifying a series of transactions/cache maintenance operations to be performed.

As with the technique of the first embodiment, the request distribution circuitry can itself issue multi-transaction requests, the recipients of these multi-transaction requests in this instance being one or more of the cache storage devices. Further, as with the first embodiment, the address for each transaction identified by the multi-transaction request is in one embodiment determined with reference to a base address specified by the multi-transaction request.

The plurality of cache storage devices can take a variety of forms. For example, they may all be cache storage devices that are shared between multiple master devices. Alternatively, they may all be individual cache storage devices associated with particular master devices. In one particular embodiment, the plurality of cache storage devices may contain a mixture of cache storage devices that are provided in association with particular master devices and other cache storage devices that are shared between a plurality of master devices.

In one embodiment, the request distribution circuitry comprises snoop circuitry configured to perform a snoop operation in respect of said plurality of cache storage devices in order to perform the cache maintenance operation specified by each of the multiple transaction requests.

In one particular embodiment, the snoop circuitry comprise a plurality of snoop circuits, each snoop circuit being associated with a different address range, and the request distribution circuitry further comprises first stage request distribution circuitry configured to analyse the address information and the quantity indication in order to determine, for each of the multiple transactions, which of the plurality of snoop circuits is required to perform the cache maintenance operation specified by that transaction, and to issue separate transaction requests to each snoop circuit dependent on said determination. Hence, in such an embodiment, the request distribution circuitry will first determine based on the address associated with each transaction which snoop circuit should receive that transaction, and will issue transaction requests accordingly to each snoop circuit dependent on that determination. This may typically result in each snoop circuit receiving multi-transaction requests identifying the particular transactions associated with that snoop circuit. The individual snoop circuits can then process those requests in order to decide which cache storage devices need to perform each of the cache maintenance operations, with those snoop circuits then issuing transaction requests on to the cache storage devices (and again one or more of those transaction requests may themselves be multi-transaction requests specifying a plurality of transactions/cache maintenance operations to be performed by the cache storage device to which that multi-transaction request is issued).

The cache maintenance tracking circuitry can take a variety of forms. However, in one embodiment, the cache maintenance tracking circuitry comprises a cache maintenance tracking circuit provided within each of said plurality of snoop circuits, each cache maintenance tracking circuit being configured to receive progress indications from the plurality of cache storage devices during performance of the cache maintenance operations specified by the transactions handled by the associated snoop circuit, and to provide progress information to the master device independently of the progress information provided from each other cache maintenance tracking circuit. In particular, when the master device issues the multi-transaction request, it places no constraints on how those transactions are processed, and accordingly there is no need for any coordination between the various cache maintenance tracking circuits. Instead, it is sufficient that the progress information provided from each of the cache maintenance tracking circuits is sufficient to enable the master device to determine when all of the transactions specified in the original multi-transaction request have been processed.

In one embodiment, the snoop circuitry may be arranged to issue a snoop request to each of the cache storage devices upon receipt of a transaction request. However, in an alternative embodiment the snoop circuitry comprises a snoop filter configured to maintain, for each cache storage device, address indications of addresses for which data is stored in that cache storage device, and the snoop operation performed for a transaction comprises performing a lookup operation within the snoop filter using the address specified by the transaction, and, for each cache storage device, issuing a snoop request to that cache storage device if that lookup operation indicates that the address matches one of the address indications maintained by the snoop filter for that cache storage device. This can reduce the amount of snoop request traffic within the system. Further, in situations where the snoop circuitry receives a multi-transaction request identifying multiple transactions to be performed, the lookups within the snoop filter may be optimised in order to reduce the power consumption associated with performing the lookup within the snoop filter.

For example, in one embodiment, the snoop filter may comprise a plurality of entries, each entry storing an address indication, and cache identifier information indicating which of said plurality of cache storage devices should be issued a snoop request if the address of a transaction matches that address indication.

However, if the snoop circuitry receives a multi-transaction request specifying a series of cache maintenance operations to be performed over a large address range, this may require the same entries within the snoop filter to be subjected to multiple lookup operations. In one embodiment, in such situations, a modified lookup operation is performed in order to reduce the number of accesses to the snoop filter. In particular, in one embodiment, the snoop filter is a set associative storage and an index portion of the address of each transaction is used to identify an entry within the snoop filter whose address indication is to be compared with that address. If the multiple transactions specified by the multi-transaction request relate to an address range large enough to require reference multiple times to each entry of the snoop filter when processing said multiple transactions, the snoop circuitry is configured to apply a modified lookup operation within the snoop filter whereby each entry of the snoop filter is subjected to a lookup once, a number of bits of the address indication obtained from that entry are masked, and then compared with a masked address common to a plurality of the transactions, and if that comparison indicates a match a snoop request is then issued to each cache storage device indicated by cache identifier information associated with that entry of the snoop filter. Such an approach can significantly reduce the power consumption associated with performing the snooping operations, and also improve performance.

The same basic approach can also be adopted within the cache storage devices, in situations where a cache storage device receives a multi-transaction request. In particular, lookups can be performed within each cache entry only once, with masking again being used to perform a modified comparison, and with a match resulting from that comparison indicating that the data values in the associated cache entries should be subjected to the cache maintenance operation.

As another way of increasing the efficiency of the snoop operation, the structure of the snoop filter entries can themselves be changed so that the address indication stored in an entry relates not only to a single cache line, but instead to multiple cache lines (for example by arranging the address indication to be a smaller number of bits of the address). The entry can then store an indication of which cache storage devices to snoop for each of the cache lines that share that reduced address indication. When a match is obtained with the snoop filter, this will then result in snoop requests being issued to each of the required caches for any or all of the cache lines associated with that entry in the snoop filter, dependent on which cache storage devices have been flagged by the entry as requiring a snoop for each of the cache lines.

The progress information provided by the cache maintenance tracking circuitry to the master device can take a variety of forms. For example, it may form a single combined response that is issued by the cache maintenance tracking circuitry once all of the multiple transactions specified by the multi-transaction requests have been performed. Alternatively, a plurality of separate items of progress information may be provided by the cache maintenance tracking circuitry, each item providing a count value. The master device can then be arranged to accumulate the count values received in order to determine when all of the transactions have been completed. Where a particular cache maintenance operation needs to be performed by multiple cache storage devices, the cache maintenance tracking circuitry will ensure that completion of that cache maintenance operation by all of those cache storage devices only results in a single "count" being returned to the master device, to ensure that the master device merely needs to accumulate the count values in order to determine when the multiple translations have been completed.

In accordance with a further embodiment, there is provided interconnect circuitry for interconnecting a master device and a plurality of cache storage devices to enable cache maintenance operations specified by the master device to be performed by the plurality of cache storage devices, the interconnect circuitry comprising: a master interface configured to receive from the master device a multi-transaction request identifying multiple transactions to be performed, the multi-transaction request providing a quantity indication indicating a number of transactions to be performed, and address information, each of the multiple transactions specifying a cache maintenance operation to be performed at an address associated with that transaction; request distribution circuitry configured to analyse the address information and the quantity indication in order to determine, for each of the multiple transactions, which of said plurality of cache storage devices are required to perform that transaction, and further configured to issue transaction requests to each of the plurality of cache storage devices to identify the transactions amongst said multiple transactions to be performed by each of the plurality of cache storage devices; and cache maintenance tracking circuitry configured to receive progress indications from the plurality of cache storage devices during performance of said multiple transactions, and to provide progress information to the master device to enable the master device to determine when said multiple transactions have been completed.

In accordance with a further embodiment, there is provided a method of performing cache maintenance operations within a data processing system comprising a master device, a plurality of cache storage devices, and interconnect circuitry coupling the master device with said plurality of cache storage devices to enable said cache maintenance operations specified by the master device to be performed by the plurality of cache storage devices, the method comprising: issuing from the master device a multi-transaction request identifying multiple transactions to be performed, the multi-transaction request providing a quantity indication indicating a number of transactions to be performed, and address information, each of the multiple transactions specifying a cache maintenance operation to be performed at an address associated with that transaction; analysing within the interconnect circuitry the address information and the quantity indication in order to determine, for each of the multiple transactions, which of said plurality of cache storage devices are required to perform that transaction, and issuing transaction requests to each of the plurality of cache storage devices to identify the transactions amongst said multiple transactions to be performed by each of the plurality of cache storage devices; and receiving within the interconnect circuitry progress indications from the plurality of cache storage devices during performance of said multiple transactions, and providing progress information to the master device to enable the master device to determine when said multiple transactions have been completed.

In accordance with a yet further embodiment, there is provided a data processing system, comprising: a master means; a plurality of cache storage means; interconnect means for coupling the master means with said plurality of cache storage means to enable cache maintenance operations specified by the master means to be performed by the plurality of cache storage means; the master means for issuing a multi-transaction request identifying multiple transactions to be performed, and the multi-transaction request providing a quantity indication indicating a number of transactions to be performed, and address information, each of the multiple transactions specifying a cache maintenance operation to be performed at an address associated with that transaction; the interconnect means including request distribution means for analysing the address information and the quantity indication in order to determine, for each of the multiple transactions, which of said plurality of cache storage means are required to perform that transaction, and further for issuing transaction requests to each of the plurality of cache storage means to identify the transactions amongst said multiple transactions to be performed by each of the plurality of cache storage means; and cache maintenance tracking means for receiving progress indications from the plurality of cache storage means during performance of said multiple transactions, and for providing progress information to the master means to enable the master means to determine when said multiple transactions have been completed.

Particular embodiments will now be described with reference to the figures.

FIG. 1A is a diagram schematically illustrating various fields specified with a multi-transaction request 10 issued by a master device in accordance with one embodiment. A first field 12 specifies a base transaction identifier that can be used in combination with transaction specific information to generate a transaction identifier for each of the transactions specified in the multi-transaction request. Further, a field 14 provides information about the number of transactions contained with the multi-transaction request. This information can take a variety of forms, and FIG. 1B illustrates two possible examples. In accordance with a first example, the field 14 actually takes the form of a size field 30 specifying the number of transactions. In an alternative embodiment, the field 14 takes the form of a bitwise field 35, where each bit is set or cleared in order to indicate whether a particular data block within a series of data blocks is to be processed by a transaction within the multi-transaction request. This information can be used in association with address information provided within the address field 16 in order to identify a start address for each transaction within the multi-transaction request.

For example, the address information field 16 may specify a base address that is associated with the first transaction in a sequence of transactions contained within the multi-transaction request. Given a particular quantity of data to be transferred between a master device and a slave device by each transaction (either as a write operation from the master device to the slave device, or as a read operation returning data from the slave device to the master device), the start address for each of the transactions in a sequence can be determined. When a single size field 30 is used, it may be assumed that the transactions are a sequential series of transactions, and the start address for each transaction can be determined accordingly from the base address in the field 16. If instead a bitwise field 35 is used, then the start address for each transaction in the series can be determined using the information in the bitwise field. Using the example shown in FIG. 1B, where the first bit, second bit and fourth bit are set, but the third bit is cleared, this can be used to identify that the first transaction occurs from the base address, the second transaction is a transaction for an adjacent block of data with a start address found by incrementing the base address by some amount determined by the size of the data handled by each transaction (for the purposes of illustration, we will assume that this start address is equal to the base address plus an offset X). The logic zero value in the third bit position indicates that the data block at the next address (i.e. base address plus 2 X) is not to be the subject of a transaction, and instead the next transaction is actually with respect to data at a start address equal to the base address plus 3 X.

Returning to FIG. 1A, a burst size field 18 may be provided to identify the amount of data transferred by each transaction. In this example, it is assumed that each transaction is a burst transaction where a predetermined quantity of data is transferred in each clock cycle (also referred to herein as a beat), and that process is repeated for a different block of data during each beat of the transaction. The burst size field can be used to identify the overall quantity of data transferred via each burst transaction (a separate response being issued for each burst transaction). This field may be optional, since in an alternative embodiment, the burst size may be predetermined.

A read/write field 20 is used to identify for each multi-transaction request whether the multiple transactions identified by that request are read transactions or write transactions. One or more optional further fields 22 may also be provided to provide other information considered relevant in any particular embodiment.

Figure 2:
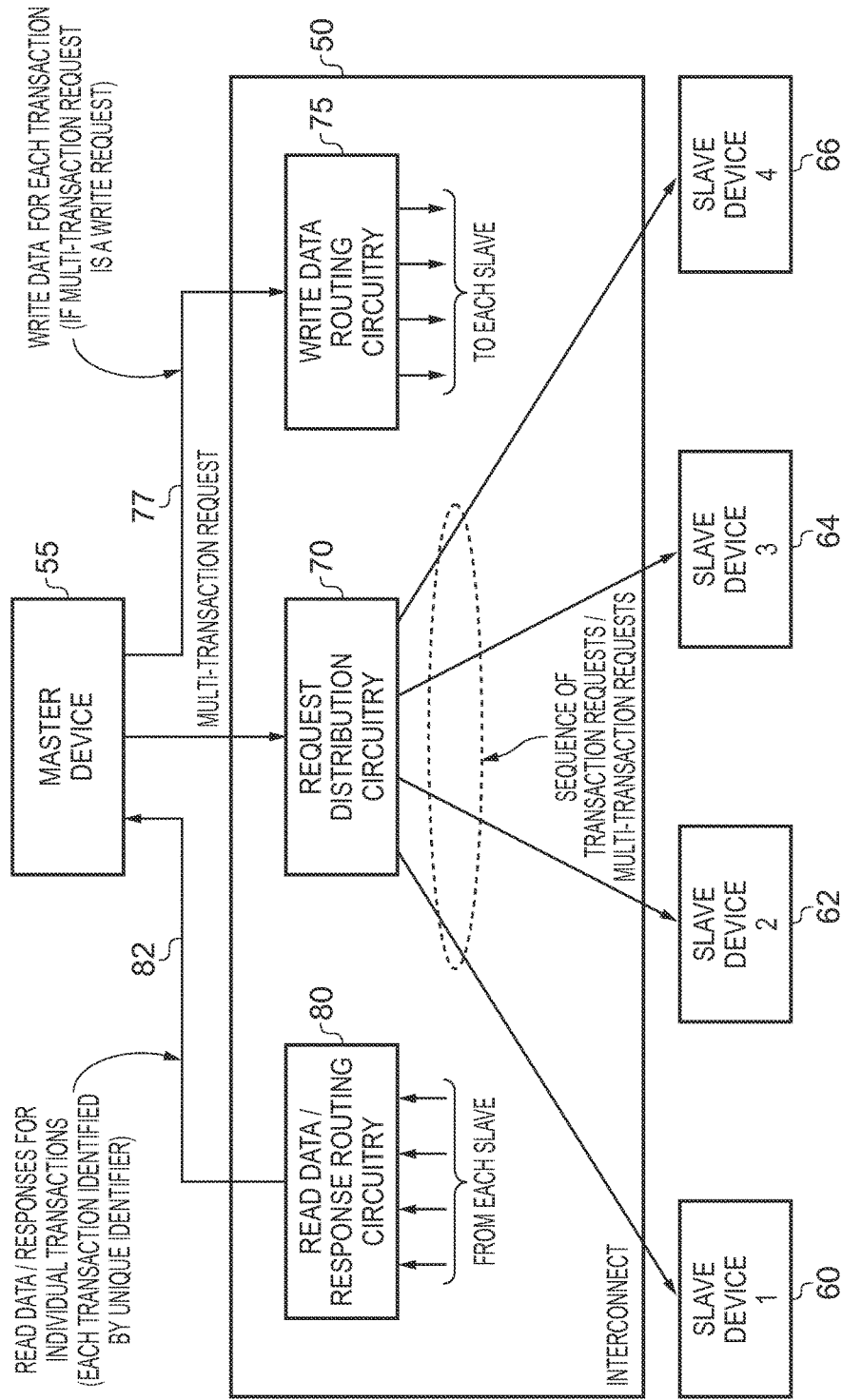
FIG. 2 is a block diagram of a data processing system in accordance with one embodiment.

FIG. 2 is a block diagram of a data processing system in accordance with one embodiment. In this example, a master device 55 is coupled with a plurality of slave devices 60, 62, 64, 66 via interconnect circuitry 50. As will be understood by those skilled in the art, often interconnect circuitry will interconnect a plurality of master devices with a plurality of slave devices, but for ease of illustration only a single master device is shown in FIG. 2. In accordance with the described embodiment, the master device 55 will issue a multi-transaction request of the form discussed earlier with reference to FIGS. 1A and 1B, and that multi-transaction request will be received by request distribution circuitry 70 within the interconnect circuitry 50. The request distribution circuitry 70 is configured to determine which slave device is required to perform each transaction specified by the multi-transaction request. Typically, each of the slave devices 60, 62, 64, 66 will be mapped to a particular address range within the full range of possible addresses (as identified by an address map), and accordingly by using the address information in the field 16 and the information about the number of transactions in the field 14, the request distribution circuitry 70 can determine a start address for each transaction, and then with reference to the address map can determine which slave device is required to execute each transaction. The request distribution circuitry 70 then issues a sequence of transaction requests to each of the slave devices.

In accordance with one embodiment, in situations where a plurality of transactions is to be handled by one particular slave device, the request distribution circuitry can form a multi-transaction request to propagate on to the slave device. By providing the slave device, via a single request, with information about multiple transactions that it needs to perform, this can enable the slave device to seek to optimise its behaviour to improve the efficiency of handling those multiple transactions. For example, if the slave device is a memory controller used to access memories such as DRAM memory, then it is typically more efficient to make multiple accesses to an open page of memory in the DRAM, since there is an overhead associated with closing a page of DRAM and opening another page. With knowledge of a series of transactions that need to be performed, the memory controller can seek to optimise the memory accesses so as to make more efficient use of open pages when performing the necessary write or read operations specified by the series of transactions identified in the multi-transaction request.

If the multi-transaction request specifies a series of write transactions, then the write data will also need to be output by the master device 55 over path 77 to the interconnect 50, where write data routing circuitry 75 will then be used to route the required write data to the relevant slave devices for each transaction. In one embodiment, the information determined by the request distribution circuitry as to which slave device is to process each transaction may also be provided to the write data routing circuitry for use in correctly routing the associated write data for each transaction. However, in an alternative embodiment, the write data of each write transaction is not issued to the slave device until the slave device requests it. Accordingly, in such an embodiment, once the request distribution circuitry 70 has issued a transaction request to a particular slave device, that slave device then issues a response back to the original master device 55 indicating that it is ready to accept the write data. This response contains the ID of the slave device to which the write data must be routed.

Accordingly, when the master device first sends the multi-transaction request, it does not know which slave device each transaction and associated write data is destined for, and instead awaits an indication from a slave device that the write data for a particular transaction within the multi-transaction request can now be sent, that indication also providing information enabling the write data routing circuitry 75 to route the write data to the appropriate slave device.

In accordance with the described embodiments, whilst the master device has issued a single multi-transaction request, it is aware of the individual transactions that it has asked to be performed. Since the transactions are discrete, the master device is not concerned with the order in which the individual transactions are performed, nor indeed does it need to have any knowledge of which slave devices are processing any particular transaction. All that is required is that the master device is advised of the completion of each transaction. For each transaction, this can be achieved by each slave device issuing response data via the read data/response routing circuitry 80 within the interconnect 50, which then routes that response data over path 82 to the master device. For write transactions, the response data merely needs to be a simple acknowledgement style signal to confirm that the write transaction has been performed. Again, a transaction identifier will be generated based on the base transaction identifier in the field 12 and some transaction specific information, to enable the master device to determine which of the multiple transactions identified in the multi-transaction request is being responded to.

For a multi-transaction request specifying a series of read transactions, the read data returned via the circuitry 80 can itself form the response required by the master device in order to determine that individual transactions have been performed, again each item of read data being accompanied by a transaction identifier identifying the particular transaction being responded to.

By such a mechanism, the master device can issue a single request specifying multiple transactions, with the various transactions constituting that multi-transaction request then being routed to the appropriate slave devices by the request distribution circuitry 70. Where an individual slave device itself receives a multi-transaction request from the request distribution circuitry, it can seek to optimise the accesses required by the multiple transactions based on a knowledge of the multiple transactions that need to be performed. For example, it may choose to reorder those transactions if it is a slave device that supports transaction reordering, in order to more efficiently perform the required transactions. Further, considering the earlier memory controller/DRAM memory example, it can seek to maximise accesses to open pages in order to more efficiently process the accesses required by the transaction. Each slave device can operate independently of the other slave devices due to the transactions each being identifiable independently, and then the responses can be provided as and when available from those slave devices via the read data/response routing circuitry 80, with each response providing a transaction identifier sufficient to enable the master device to identify the particular transaction amongst the multiple transactions that is being responded to. This mechanism enables more optimum utilisation of the available bandwidth in the communication paths with the slave devices whilst also enabling performance improvements to be realised due to certain slave devices being able to improve the efficiency with which the transactions are processed based on an overview of multiple transactions that need to be performed.

For a multi-transaction request that specifies a series of write transactions, there is potential that if the write data required for the various transactions were to be output to the write date routing circuitry 75 from the master device 55 in association with the multi-transaction request, then this could lead to congestion within the write data routing circuitry 75. In particular, the write data routing circuitry will typically consist of a number of stages with associated write queues, and certain of those queues may become full, waiting for the various write transactions to be processed. This can reduce the efficiency of operation of the interconnect circuitry. In one embodiment, such potential write congestion is alleviated by deferring the transmission of the write data from the master device, as illustrated schematically in FIG. 3. For the purposes of illustration, one of the slave devices 60 is shown, the slave device having a request queue 100 into which each transaction request forwarded to the slave device is placed. In accordance with one embodiment, if the slave device receives a multi-transaction request, that occupies only one slot within the request queue 100. The request processing circuitry 105 is arranged to process the requests from the queue. Since a multi-transaction request can be arranged to occupy only a single request queue, this effectively allows the request processing circuitry to have visibility of a higher number of pending transactions than may otherwise be the case, and hence improves the efficiency of any reordering that may be applied by the request processing circuitry, due to the increased visibility of future transactions.

Figure 3:
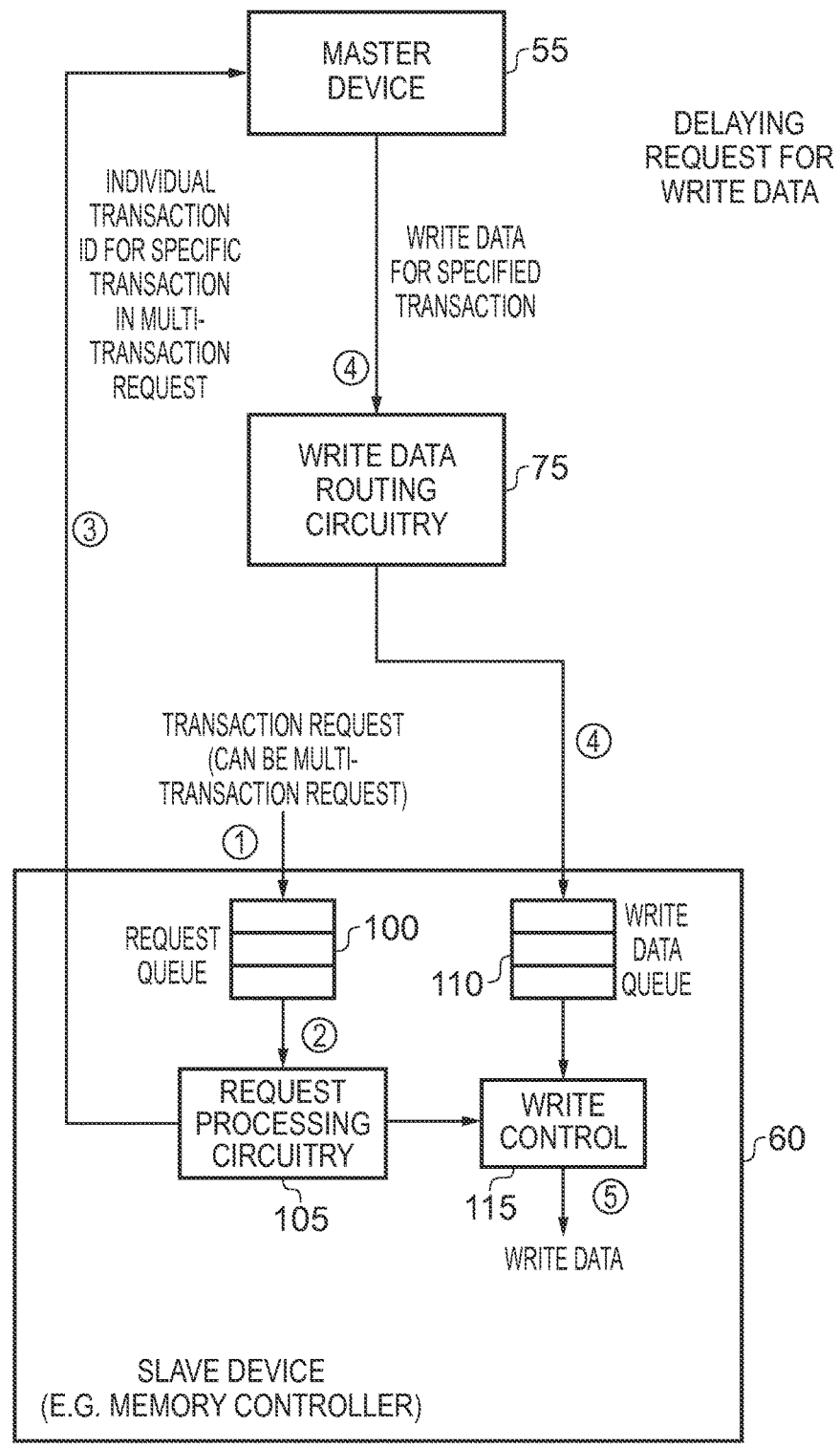
FIG. 3 schematically illustrates a deferred write mechanism that may be incorporated within the system of FIG. 2 in accordance with one embodiment.

In FIG. 3, the numerals enclosed in a circle are used to denote the general sequence of processing from receipt of the transaction request by the slave device to the writing of the associated write data of that transaction request.

When the request processing circuitry is processing a multi-transaction request, then for each transaction, it can send an appropriate control signal back to the master device 55 requesting the write data relating to that transaction. That request can be tagged with a transaction identifier that is derived from the base transaction identifier of the multi-transaction request and some transaction specific information (such as some low order bits of the start address). This will then cause the required write data to be output from the master device via the write data routing circuitry 75, where it will be placed within the write data queue 110. The request processing circuitry 105 will control the write control circuitry 115, so that it can then read that write data from the queue, and initiate the write operation. For the earlier example of a memory controller and associated memory device, the elements shown within the slave device 60 of FIG. 3 may be provided within the memory controller, and the write data will be output from the write control element 115 for storage within the associated memory device.

The mechanism for triggering the master device to output the write data can take a variety of forms. For example, a handshake mechanism may exist between the slave device and the master device to enable the slave device to request output of the write data. If such a handshake mechanism is not available, the slave device may be able to instigate eviction of the write data from a cache of the master device, for example by causing snoop circuitry within the interconnect to issue a snoop request to evict the data from the master devices cache.

Figure 4:
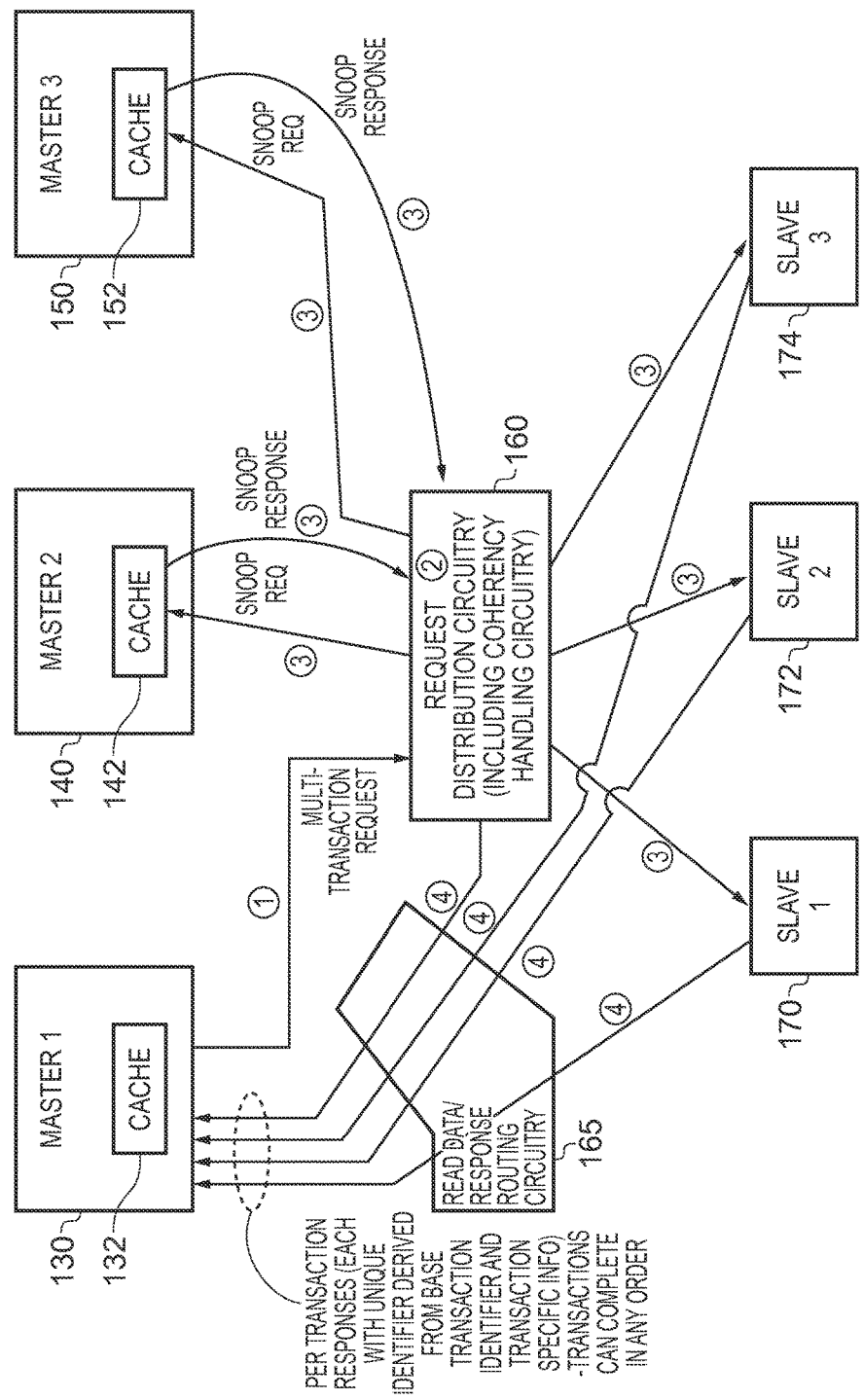
FIG. 4 schematically illustrates an embodiment where the request distribution circuitry includes coherency handling circuitry to ensure cache coherency, in accordance with one embodiment.

FIG. 4 illustrates how the request distribution circuitry can be configured to manage issues of cache coherency when processing multi-transaction requests. As with FIG. 3, the numbers enclosed in circles indicate a relative ordering of the various interactions shown in the figure. In this example, the data processing system includes a series of master devices 130, 140, 150 each of which have their own associated cache 132, 142, 152. Each of those caches may be a single level of cache, or may themselves be constituted by a plurality of levels of cache, for example a level 1 cache in combination with a level 2 cache. As shown in the figure, it is assumed that master device 130 issues a multi-transaction request to the request distribution circuitry 160, the request distribution circuitry in this example including coherency handling circuitry, which in one embodiment may take the form of snoop circuitry.

In one embodiment, the coherency handling circuitry within the request distribution circuitry 160 may be configured to issue snoop requests to the caches 142, 152 of the other master devices 140, 150 in respect of the address of every transaction issued in the multi-transaction request, with the snoop responses then being returned to the request distribution circuitry. Alternatively, the coherency handling circuitry may have access to a storage structure providing an indication of the addresses for which data is held in the caches 142, 152 and only then to issue snoop requests to the relevant caches when that storage structure indicates that the cache has stored data whose address indication matches the address indication in the transaction. The storage structure within the coherency handling circuitry of the request distribution circuitry 160 may take a variety of forms, but in one embodiment takes the form of a snoop filter for keeping a log of address portions and an identification of the caches that should be snooped for a transaction whose associated address portion matches that logged address portion in the snoop filter.

The actions required to be taken in response to the snoop request will vary dependent on the embodiment, and the type of transaction. For example, for a write transaction, the snoop request may merely cause any copy of the data stored in the local caches 142, 152 to be invalidated, with the new write data then being provided by the master device 130 for storage in the relevant slave device 170, 172, 174. This will ensure that the master devices 140, 150 do not subsequently access the wrong data by accessing an out-of-date version of the data in their local caches. Alternatively, the new write data could be caused to be written into the snooped cache in addition to that write data being written to memory. For read transactions, the snoop request will typically cause the required data to be output from the snooped cache as part of the snoop response, if the data that was requested by the read transaction is found within the cache. This will allow the coherency handling circuitry 160 to then return the required read data via the read data/response routing circuitry 165 to the master 130 without needing to access the slave devices 170, 172, 174 in order to access that data.

In embodiments where each of the caches 142, 152 is snooped in respect of every transaction in the multi-transaction request, then for read transactions it will typically be the case that the snoop responses will be gathered by the coherency handling circuitry before it is determined whether an associated transaction request needs to be propagated onto the slave devices (due to the required read data not being present in one of the caches 142, 152). For a series of write transactions, if the snoop requests are merely causing the relevant cache lines to be invalidated if they contain a previous version of the write data, then the write transactions can be propagated onto the required slave devices 170, 172, 174 at the same time. Similarly, for embodiments where a snoop filter is used such that only a subset of the transaction requests specified by the multi-transaction request may require snoop requests to be issued, there will be a number of transaction requests that can be propagated on without delay to the slave devices 170, 172, 174 without waiting for any snoop responses to be received. For this reason, all of the various snoop requests, snoop responses and transaction requests propagated from the request distribution circuitry 160 are labelled with the reference numeral 3, to indicate that they are essentially occurring in parallel, subject to the constraints outlined above. As with the earlier described embodiment, where the request distribution circuitry identifies that a plurality of transactions require propagation to one of the slave devices, it can issue a multi-transaction request on to the relevant slave device identifying the transactions to be performed by that slave device.

As will be appreciated from the earlier discussions, each of the slave devices will independently output responses via the read data/response routing circuitry 165 to the master device 130 to indicate completion of each of the transactions performed. In addition, the coherency handling circuitry within the request distribution circuitry 160 may itself be a source of responses routed back via the read data/response routing circuitry 165 to the master device 130, based on snoop responses received from the snooped caches 142, 152. As with the responses from the slave devices, any responses from the coherency handling circuitry will have a transaction identifier associated therewith derived from the base transaction identifier in the field 12 of the multi-transaction request and some transaction specific information, such as a certain number of low order address bits of the start address of the transaction. Accordingly, as with the earlier described embodiments, the master device 130 can monitor the various responses provided via the read data/response routing circuitry 165 in order to determine when each of the transactions specified in the multi-transaction request has been completed.

Figure 5:
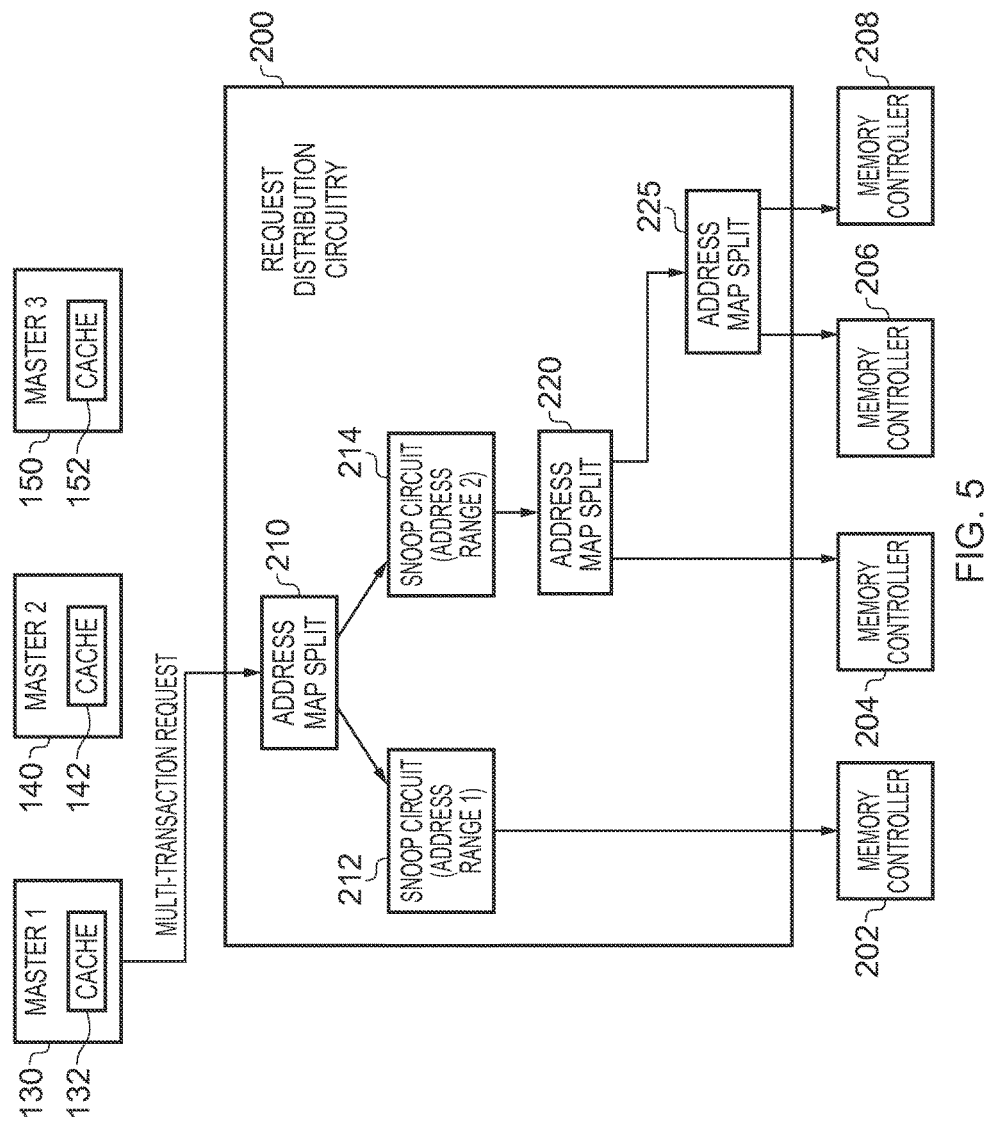
FIG. 5 schematically illustrates how the request distribution circuitry may be formed of a number of hierarchical distribution blocks in accordance with one embodiment.

FIG. 5 schematically illustrates how the request distribution circuitry 200 may be formed from a plurality of discrete stages arranged in a hierarchical manner. In this example, it is assumed that snoop circuitry is provided within the request distribution circuitry that is formed from two separate snoop circuits 212, 214, each snoop circuit being associated with a different address range. Accordingly, an address map splitting circuit 210 is provided which analyses the originally received multi-transaction request in order to determine for each of the transactions specified in the multi-transaction request which snoop circuit should review that transaction. As a result of that analysis, a modified multi-transaction request is sent to each of the snoop circuits identifying the various transactions that need reviewing by those snoop circuits. The first snoop circuit 212 will determine for each transaction that it receives, whether any snoop request needs to be issued in respect of the caches 142, 152 within the master devices 140, 150. If so, those snoop requests will be issued and the required snoop responses received. For write transactions, the snoop circuit will also typically issue transaction requests on to its associated slave device, which in this case is the memory controller 202. Again, this can be achieved by issuing a multi-transaction request from the snoop circuit 212 to the memory controller 202, to allow the memory controller 202 to optimise its behaviour when handling those multiple transactions. The same action can be taken for any read transactions that cannot be responded to based on the snoop responses.

The snoop circuit 214 will operate in an analogous way to the snoop circuit 212, issuing snoop requests to the caches 142, 152 as required. However, in this case there is not only a single slave device associated with the address range managed by the snoop circuit 214 and instead in this example there are three slave devices formed by memory controllers 204, 206, 208. Accordingly, the transaction requests output by the snoop circuit 214 first pass to an address map splitting circuit 220, which in this example has knowledge of the addresses associated with the memory controller 204. Accordingly, for any transactions whose associated address maps to the memory controller 204, then the address map splitting circuit 220 will issue that transaction to the memory controller 204. All other transaction requests will then be forwarded on to the address map splitting circuit 225, which has knowledge of the addresses associated with each of the memory controllers 206 and 208, and accordingly splits the received transactions accordingly in order to propagate the transaction requests to the appropriate memory controller 206, 208.

It will be appreciated that FIG. 5 is merely an example of how the request distribution circuitry may be arranged in a hierarchical manner to route the various transaction requests on to the required slave devices, whilst performing snoop requests as required.

It may be the case that the addresses associated with a particular slave device are interleaved with the addresses associated with another slave device, either at a coarse level or at a finer level of granularity. For example, this is often the case with DRAM memory, where multiple memory controllers will be provided, each controlling access to an associated DRAM memory block, and the addresses being interleaved amongst the various DRAM memory blocks in order to improve access times. In one embodiment, the request distribution circuitry may include interleave support circuitry in order to assist in splitting a received multi-transaction request into transaction requests destined for each of the slave devices. This is shown by way of example in FIG. 6A, where the master device 250 is coupled to two slave devices 270, 280 via an interconnect that includes request distribution circuitry 255. The request distribution circuitry includes an interleave support block 260 which has access to a memory map 262 identifying how the addresses are mapped to the two slave devices 270, 280, which may for example be memory controllers. Each of the slave devices will have a transaction handler 272, 282 associated therewith to perform the transactions for which it receives transaction requests. As discussed earlier, the slave devices may themselves receive multi-transaction requests from the request distribution circuitry 255, and in that event the transaction handlers will determine each of the transactions to be performed, and then cause those transactions to be performed by the slave device, with response data then being routed back to the master device to indicate completion of each of the transactions.

Figure 6A:
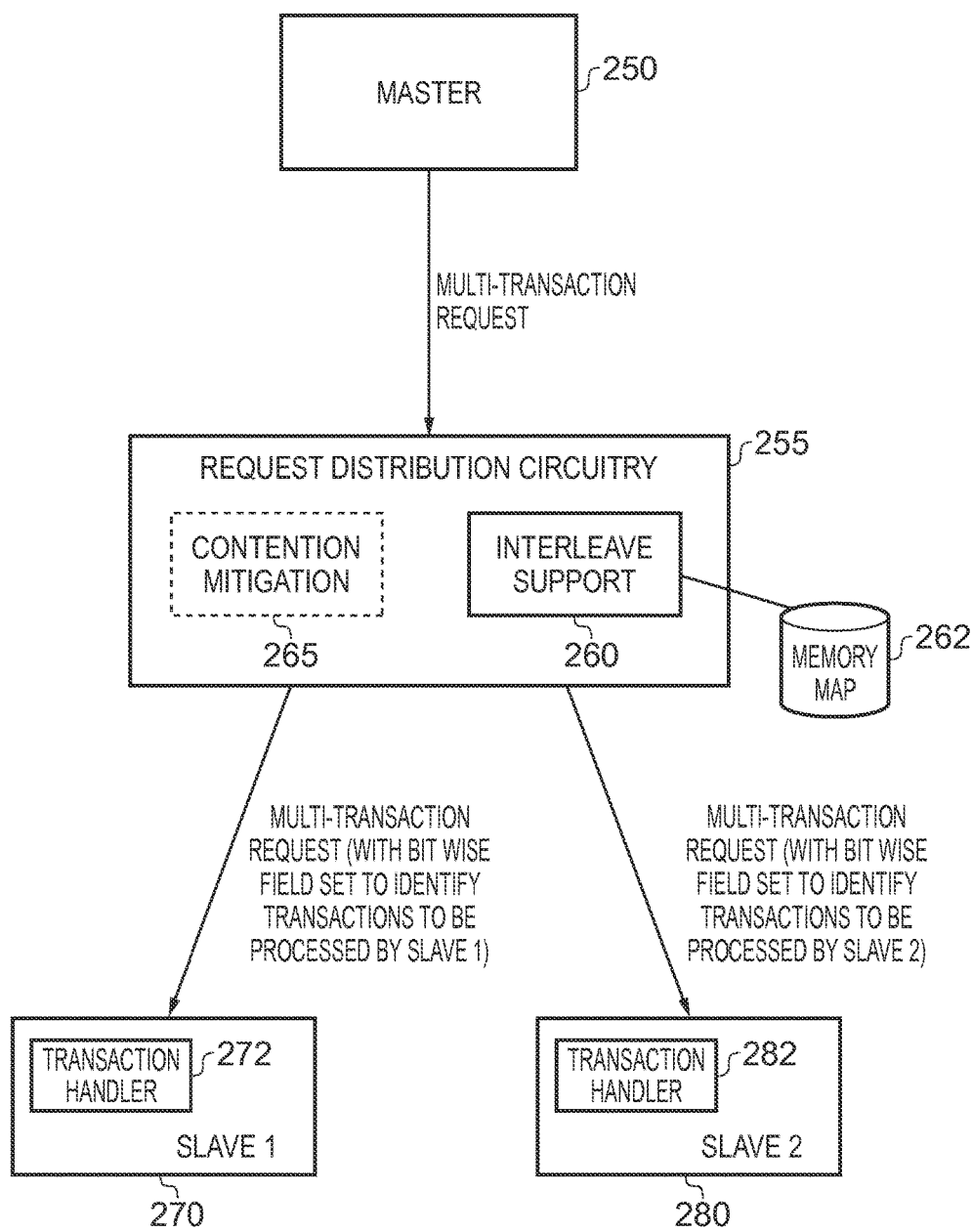
FIGS. 6A and 6B schematically illustrate how interleave support functionality can be incorporated within the request distribution circuitry in accordance with different embodiments.

In the example of FIG. 6A, the request distribution circuitry 255 analyses the multi-transaction request, and in particular the interleave support block 260 makes reference to the memory map 262 in order to determine which transactions need routing to which of the slave devices 270, 280. The request distribution circuitry 255 then creates a modified multi-transaction request sent to each of the slave devices. In this embodiment, the modification involves setting the number of transactions information within the field 14 for each multi-transaction request issued by the request distribution circuitry, to identify to the recipient slave device which transactions need to be performed. In one embodiment, this can be achieved by using a bitwise field such as the bit wise field 35 in FIG. 1B to identify the particular transactions within the multi-transaction request which are to be processed by the recipient slave device. Hence, the multi-transaction request issued from the request distribution circuitry 255 to the slave device 270 will have that bitwise field set differently to the multi-transaction request sent from the request distribution circuitry 255 to the slave device 280, such that each of the slave devices will then perform the required transactions and issue the required responses to the master device. The master device will then be able to determine when each of the transactions specified in its originally issued multi-transaction request has been completed.

Figure 6B:
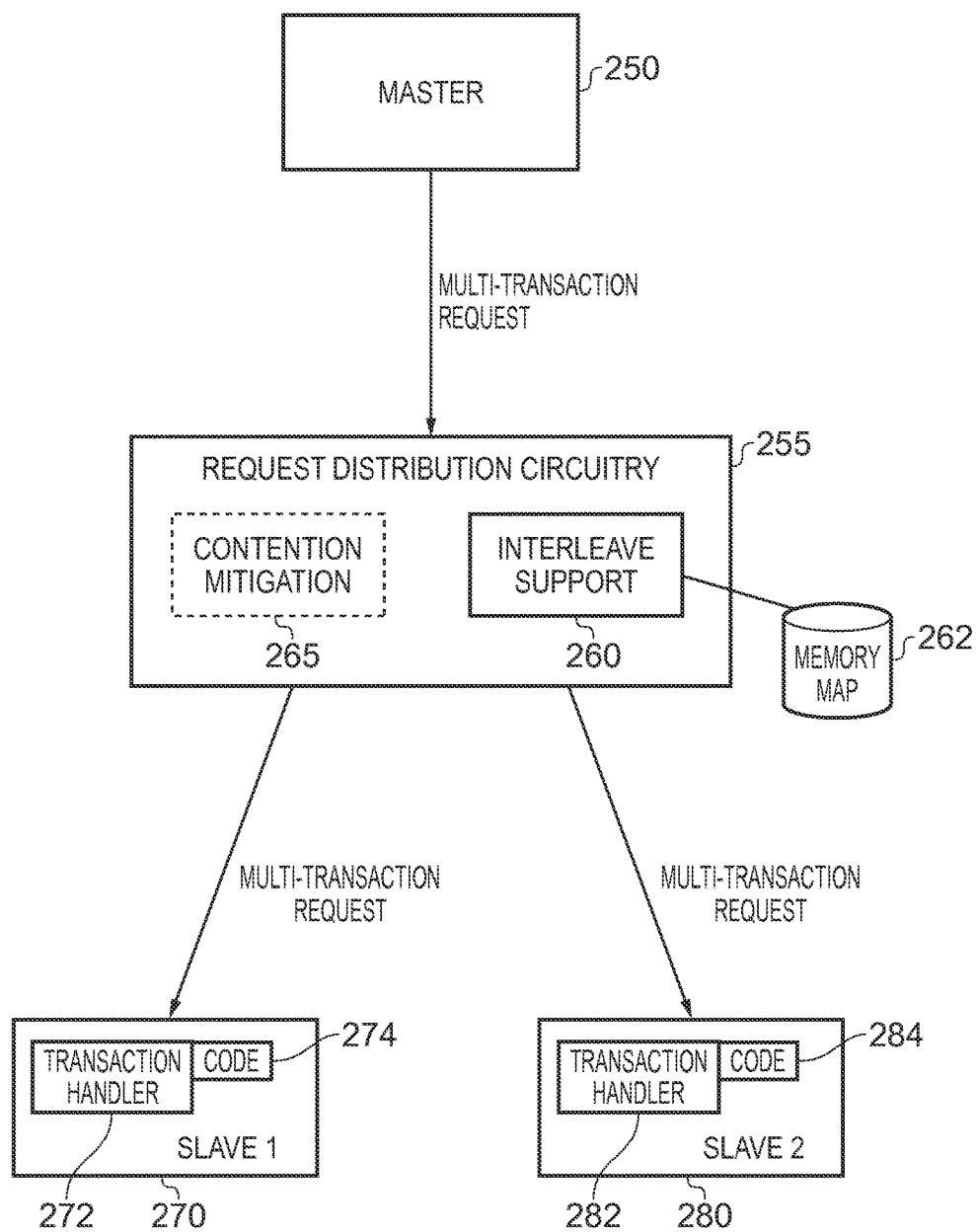

FIG. 6B shows an alternative embodiment, where each of the slave devices 270, 280 locally store code information 274, 284 identifying the interleave pattern used to interleave addresses between the slave devices 270, 280. In this embodiment, both of the slave devices 270, 280 then receive the same multi-transaction request and use the associated code information 274, 284 to determine which of the transactions within that multi-transaction request are to be processed. The interleave support block 260 is then used to determine which transactions are to be handled by either the slave devices 270 or the slave device 280, and to then construct the multi-transaction request that is broadcast to both of those slave devices in a way that will enable those slave devices to use their locally stored code 274, 284 in order to identify the particular transactions that they need to process.

Figure 7A:
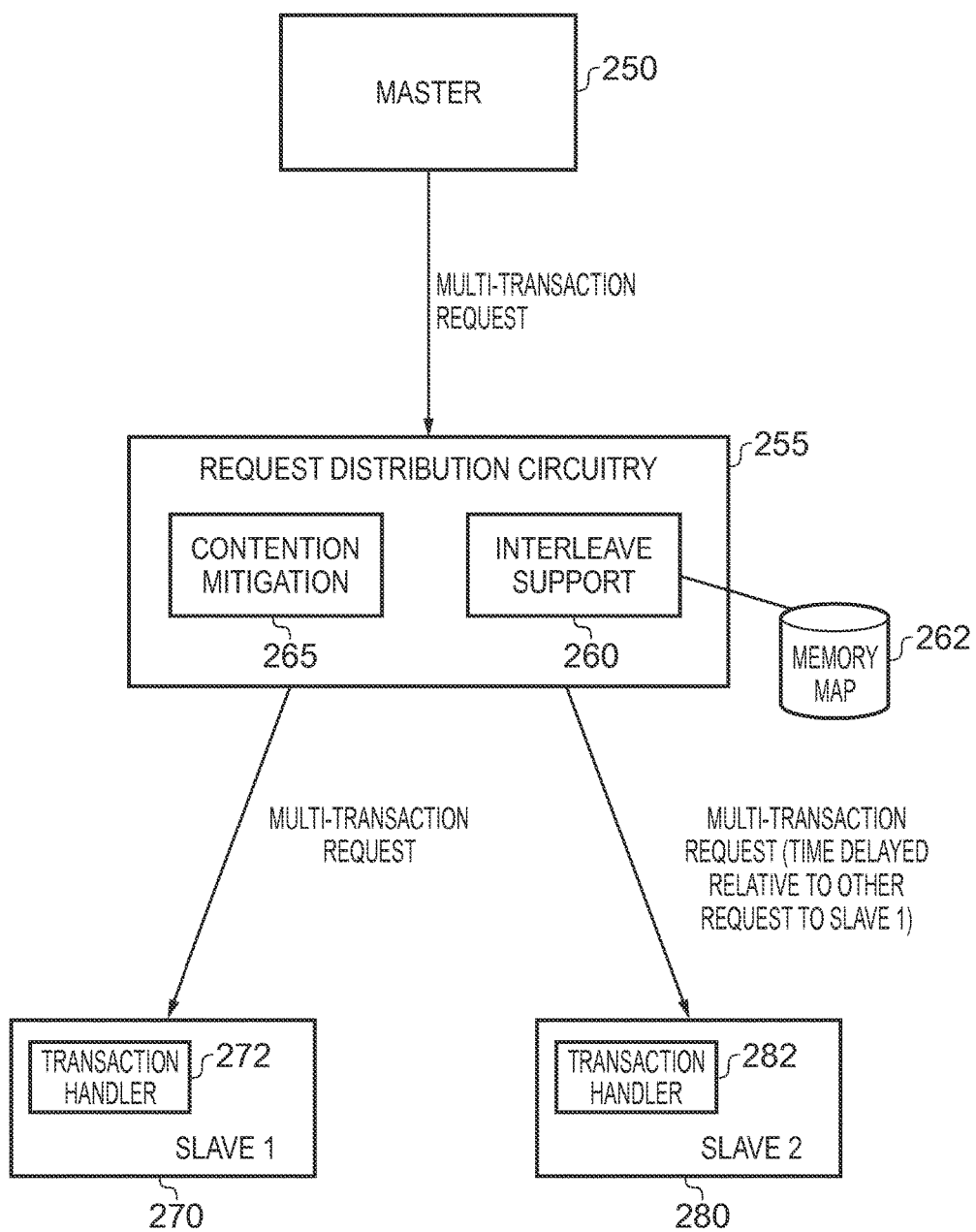
FIGS. 7A and 7B illustrate how contention mitigation functionality may be incorporated within the request distribution circuitry in accordance with different embodiments.

In FIGS. 6A and 6B, an optional contention mitigation block 265 is shown. The way in which this block may be used will be described now with reference to FIGS. 7A and 7B. When processing the various transactions specified by a multi-transaction request, there is potential for contention issues to arise within the read data/response routing circuitry of the interconnect, and also, for write transactions, within the write data routing circuitry of the interconnect. The possibility of contention will arise in any system where there are multiple transactions being serviced at the same time. However, since the request distribution circuitry 255 has control over how the multi-transaction request is handled, and in particular as to how the various slave devices required to perform the transactions specified in that multi-transaction request are notified of those transactions, then the request distribution circuitry 255 can include a contention mitigation block 265 to apply a contention reduction measure in order to seek to reduce contention within the interconnect. As one example of a contention reduction measure that could be taken (see FIG. 7A), the request distribution circuitry 255 may be arranged to issue a multi-transaction request to the slave 270, but to time delay transmission of the required multi-transaction request to the other slave device 280. This is likely to introduce a stagger in the timing with which responses are routed back to the master device, hence reducing contention.

Figure 7B:
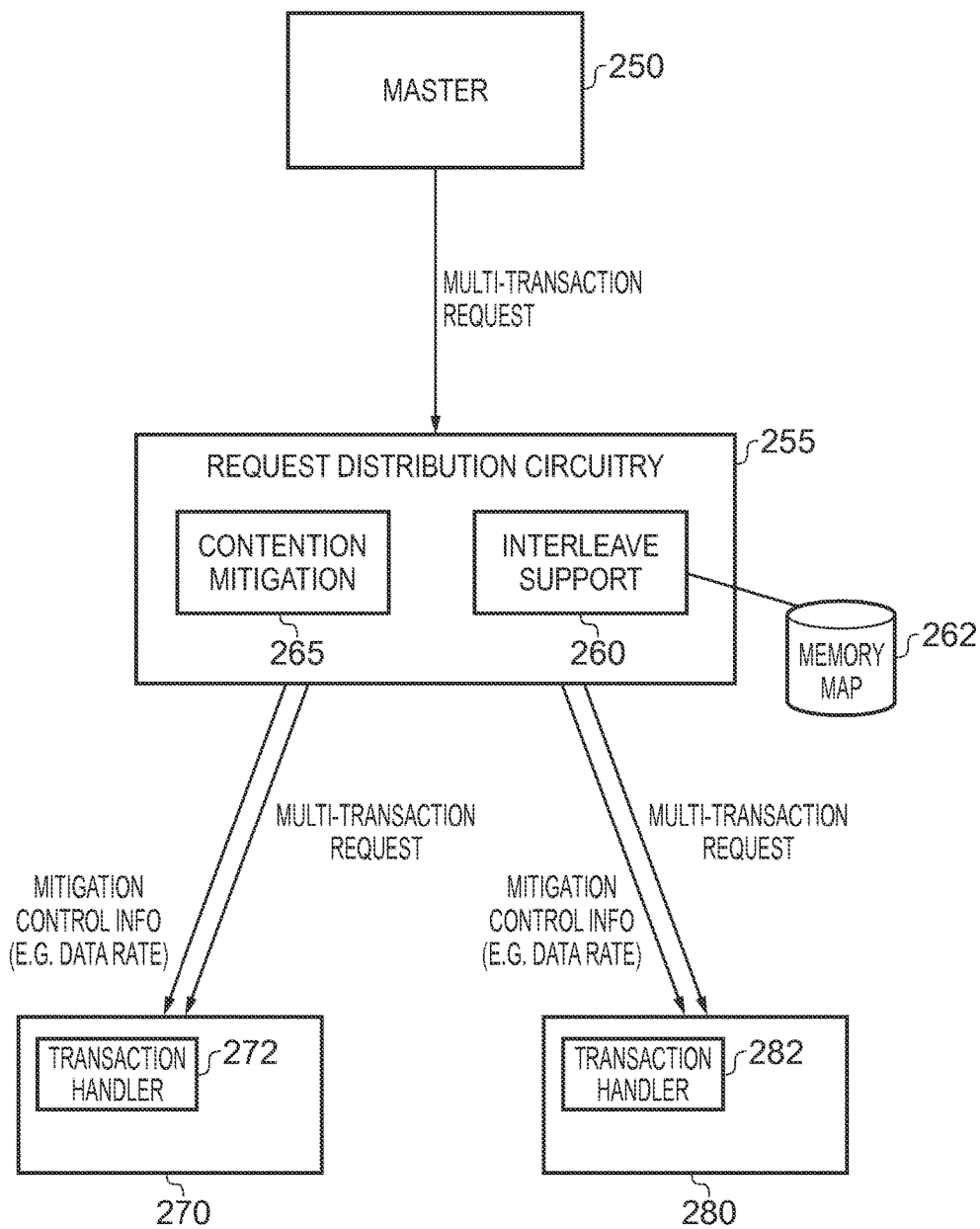

FIG. 7B illustrates an alternative embodiment where the multi-transaction requests are issued to each slave device 270, 280 from the request distribution circuitry 255 at essentially the same time, but mitigation control information is included as a sideband signal with each of the multi-transaction requests. In one example, this may specify some maximum data rate that can be used by the slave devices, for example, to reduce the maximum rate at which each slave device may provide responses to the master device, or to reduce the maximum rate at which each slave device may request write data from the master device in the event of the multi-transaction request relating to multiple write transactions. This will serve to reduce the likelihood of contention within the interconnect. Particular time slots could be allocated to each of the slave devices for the return of response data via the read data/response routing circuitry 80 as another measure of reducing contention.

In an alternative embodiment, where a handshake signal is used between the slave devices and the master device to request write data for write transactions, then there may be no need to specifically undertake contention mitigation measures in respect of the write data routing circuitry 75. Instead, if two slaves simultaneously request write data at the same time, the master device will only accept one of those requests and provide the write data for the accepted request. The slave device whose request is not serviced at that time can either re-assert the request, or could reschedule a different transaction whilst it is waiting for the write data.

Figure 8:
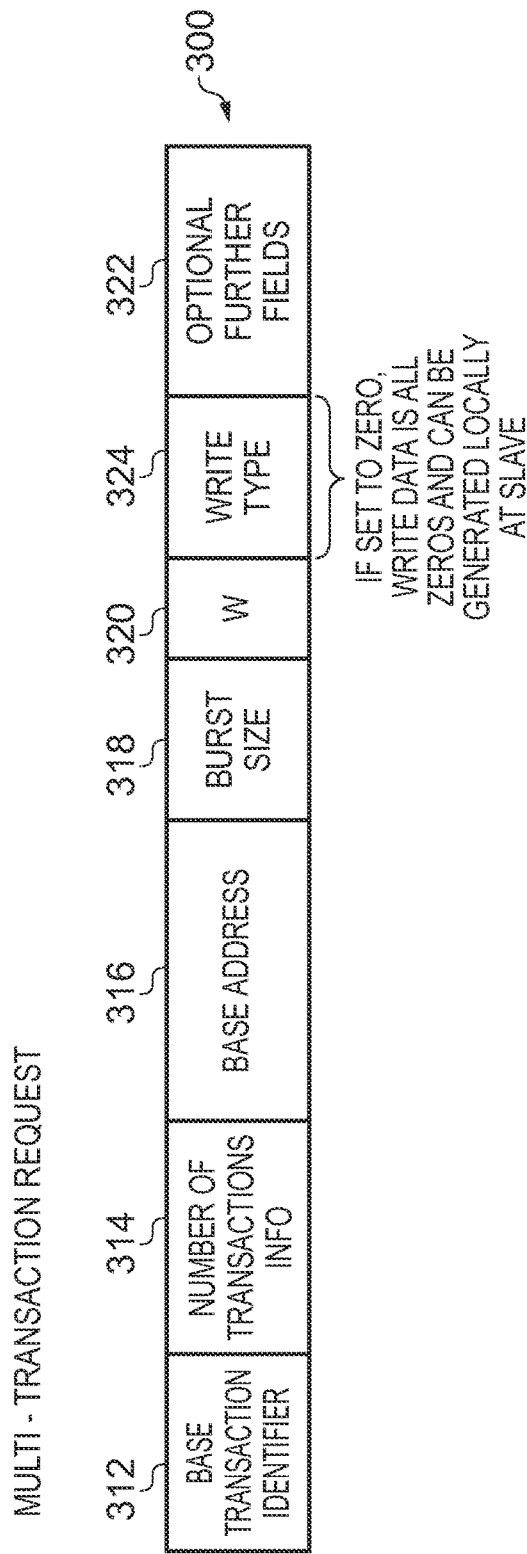
FIG. 8 schematically illustrates a multi-transaction request in accordance with an alternative embodiment.

FIG. 8 schematically illustrates another format of multi-transaction request that may be used in one embodiment for certain types of write transactions. The multi-transaction requests 300 includes various fields, the fields 312, 314, 316, 318, 320 and 322 corresponding with the fields 12, 14, 16, 18, 20 and 22 illustrated in FIG. 1A. In this example, the read write field 320 is set to identify that the multi-transaction request relates to a series of write transactions. A write type field 324 is also provided, which can be set to a first value to identify a normal write, or can be set to a second, special value, to identify a particular form of write operation where the write data can be implied directly from the write type field. For example, in one embodiment, if the write type field is set to a logic zero value, this means that the write data for every write transaction will be a series of logic zero values, thereby allowing a whole region of memory to be reset to a logic zero value. With such a form of multi-transaction request, there will be no need for the slave devices to individually request the write data for each transaction, since the write data will be implied, and can be locally generated. This reduces write data congestion, and power consumption within the interconnect.

Figure 9:
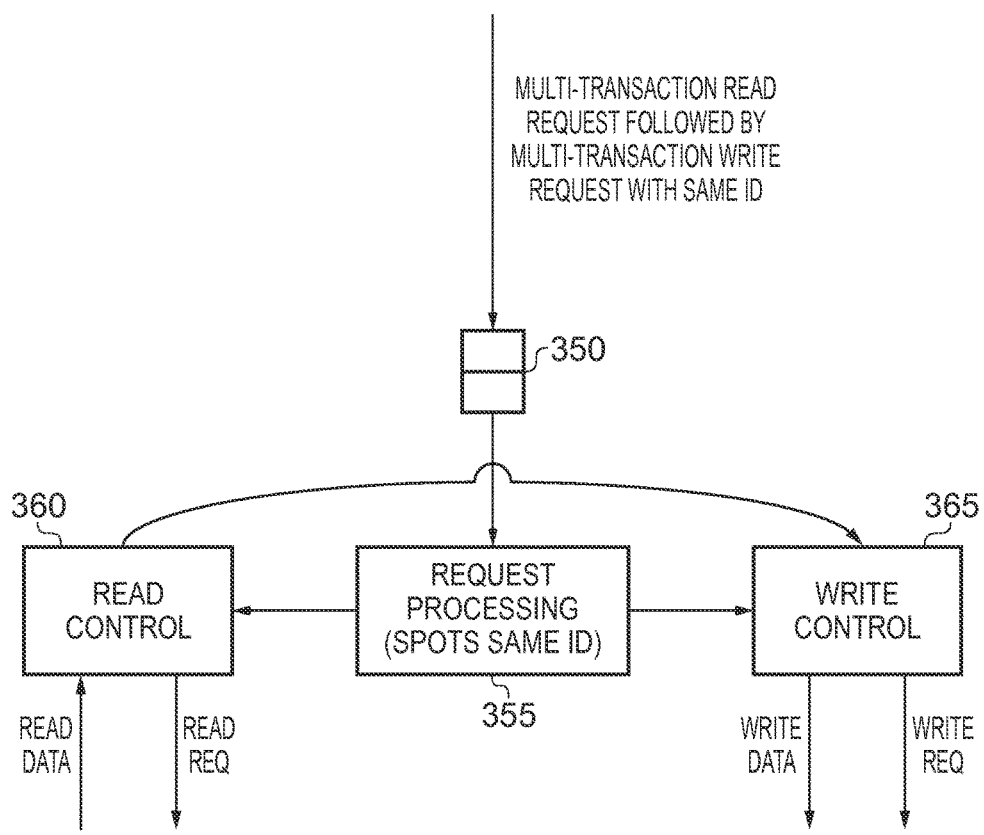
FIG. 9 schematically illustrates how a memory copy operation may be performed in accordance with one embodiment.

The multi-transaction request approach of the described embodiments can also be used to perform efficient memory copy operations, as illustrated schematically in FIG. 9. In accordance with a memory copy operation, data is read from a first address and then written directly to a second address. In one embodiment, such a memory operation can be performed for a large range of memory addresses by issuing a multi-transaction read request followed by a multi-transaction write request that is to be associated with the multi-transaction read request. One way of indicating the association between the multi-transaction read request and the multi-transaction write request is to use the same base transaction identifier for both multi-transaction requests. Considering first the situation where all of the addresses the subject of the multi-transaction write request reside within a single slave device, then the components shown in FIG. 9 may be provided within that slave device, and include a queue 350 into which the multi-transaction requests are received, and a request processing circuit 355 for processing the requests within the request queue. In processing the requests, the request processing block 355 will communicate with both read control circuitry 360 and write control circuitry 365 to cause the required read and write operations to take place. On spotting that the queue contains a multi-transaction read request followed by a multi-transaction write request with the same base transaction identifier, then the request processing block 355 will control the read control circuit to perform the required read operations, and each item of read data will then be forwarded directly from the read control block to the write control block 365, which the request processing block will cause to perform the required write operations.

In situations where the read and write operations are not all being performed in respect of the same slave device, for example where the data is being read from one slave device, and then written to another slave device, then the co-ordination between the two slave devices can be implemented within the interconnect structure so that the read data returned to the interconnect from one of the slave devices is routed directly to the write control block in the other slave device to cause the data to be written to the required memory addresses within that other slave device.

In an alternative embodiment, rather than requiring separate multi-transaction read requests and multi-transaction write requests in order to perform a memory copy function, a modified multi-transaction read request can be specified that includes write address information to enable the address at which each read data item should be written to be determined. The write address information could take a variety of forms, but in one embodiment may comprise an offset indication indicating an offset to be applied to each read address in order to calculate the corresponding write address.

As will be understood, for virtually addressed data, the length of a multi-transaction request will typically be limited by the read or write encountering a page boundary.

Figure 10:
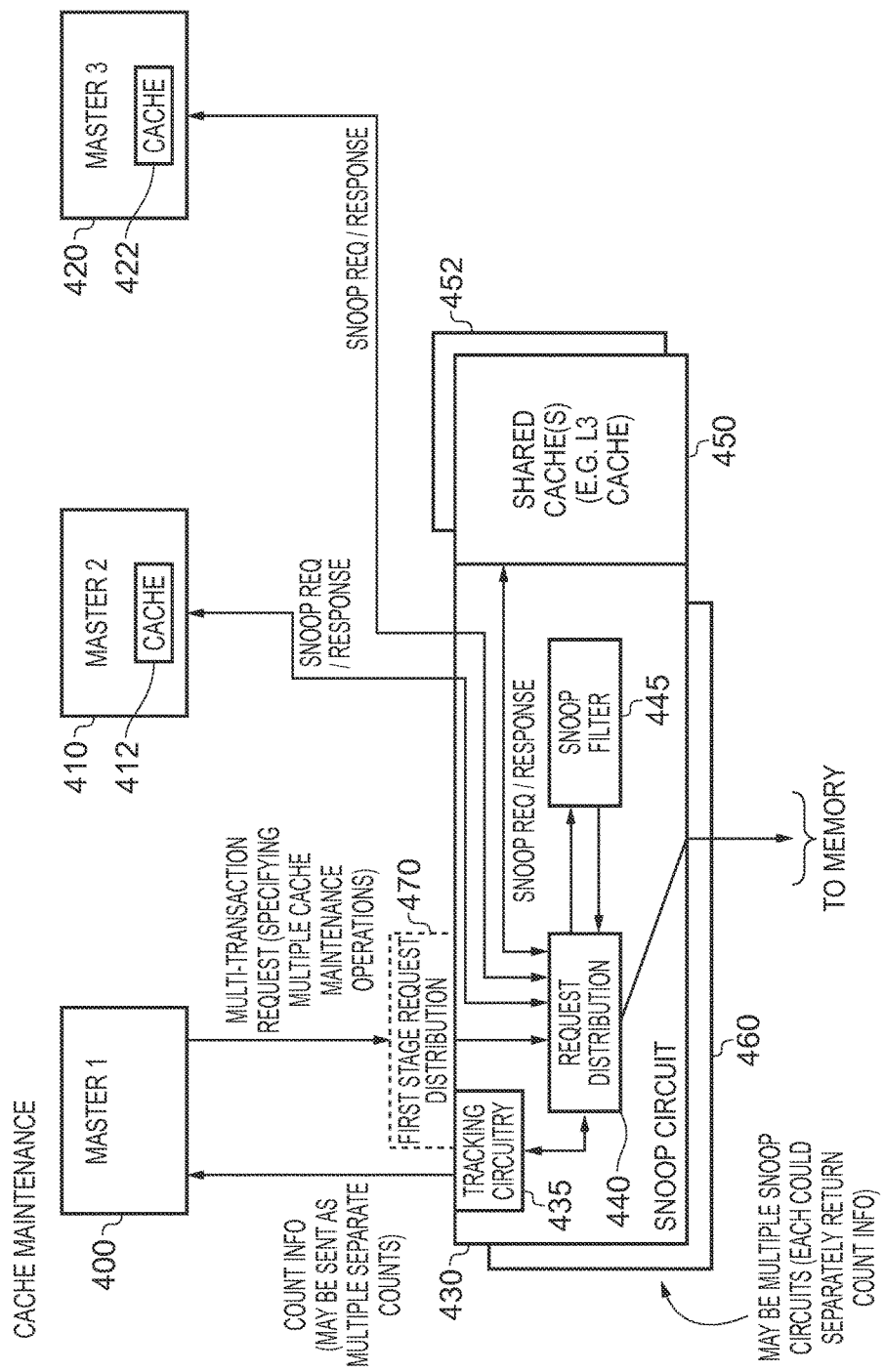
FIG. 10 illustrates a data processing system in accordance with an alternative embodiment, enabling cache maintenance operations to be performed through the issuance of a multi-transaction request.

The multi-transaction request approach described in the earlier embodiments can also be used in order to increase the efficiency of cache maintenance operations initiated by transactions issued from a master device to snoop circuitry within an interconnect, in order to cause a cache maintenance operation to be performed in respect of multiple caches within the system. Such an arrangement is illustrated by way of example with reference to FIG. 10. In this example, a master device 400 issues a multi-transaction request (where each transaction within the multi-transaction request specifies a cache maintenance operation), and that multi-transaction request is received by request distribution circuitry 440 within a snoop circuit 430. A plurality of caches may be provided within the system, and the request distribution circuitry 440 determines with reference to the address information and the quantity indication (i.e. indicating the number of transactions) within the multi-transaction request which caches need to be subjected to which cache maintenance operations. The multiple caches may either be local caches 412, 422 associated with other master devices 410, 420, or may be a number of shared caches 450, 452, for example level 3 caches accessible to each of the master devices 400, 410, 420. In one embodiment, as shown in FIG. 10, the multiple caches may comprise both a mixture of local caches 412, 422 and shared caches 450, 452.

In one embodiment, for every transaction, a snoop request is issued to each of the caches to initiate a lookup within those caches, and the performance of a cache maintenance operation on the associated cache line if a hit is detected as part of the cache lookup (i.e. if the relevant address portion of the transaction matches an address portion stored in association with the cache line).

Figure 11:
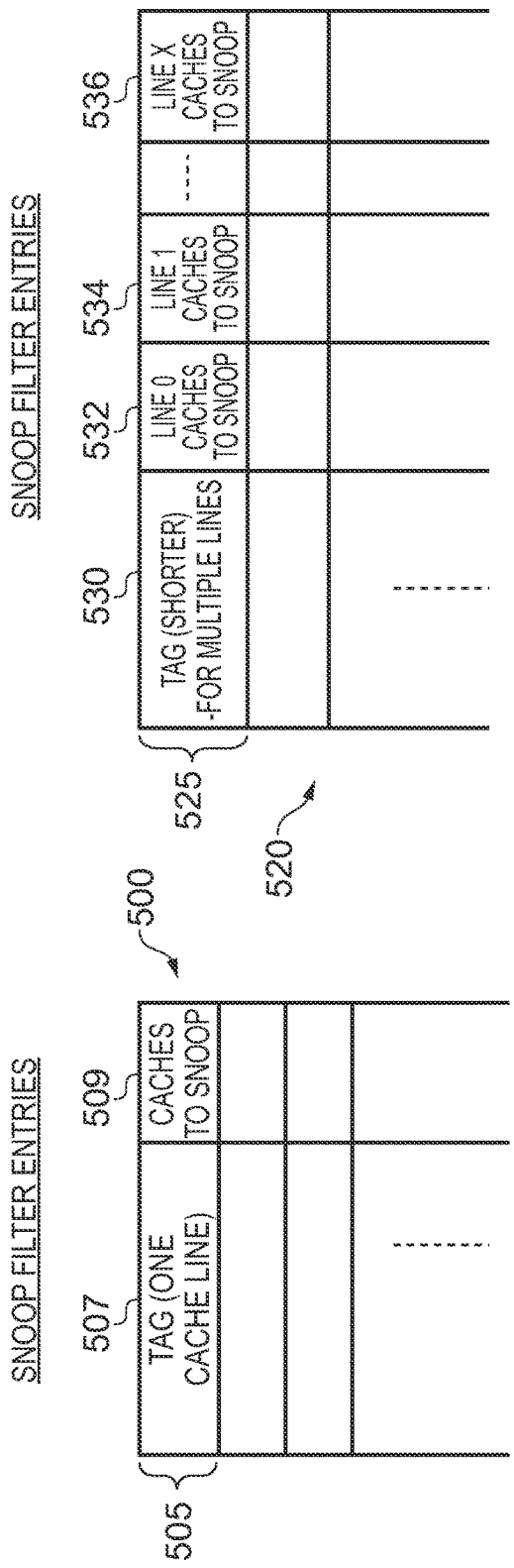
FIGS. 11A and 11B illustrate two different formats for the entries within the snoop filter of FIG. 10, in accordance with different embodiments.

However, in an alternative embodiment, a snoop filter 445 is maintained having a plurality of entries identifying an address portion, and providing an indication of which caches need to be subjected to a snoop request if the corresponding address portion of the transaction matches that stored address portion in the snoop filter entry. Such an arrangement is shown in FIG. 11A, where each entry 505 in the snoop filter 500 includes a tag address portion 507 which is an address portion common to all of the data values held within a cache line of the cache. In addition, each entry stores an indication in field 509 of the caches that need to be snooped if the tag portion 507 matches the tag portion of a transaction (in this cases the transaction specifying a cache maintenance operation). By using the snoop filter approach, this can reduce the amount of snoop request traffic within the system by determining the subset of the caches that need to be subjected to each cache maintenance operation.

The cache maintenance operation can take a variety of forms, as will be understood by those skilled in the art. For example, it may require the contents of a cache line to be cleaned and invalidated. The clean operation will require the current contents to be written out to memory prior to the memory being invalidated, if the data held in the cache line is more up-to-date than the data stored in memory.

Since the master device 400 specifies a multi-transaction request identifying multiple transactions, and accordingly multiple cache maintenance operations that need to be performed, where the request distribution circuitry 440 determines that a particular cache needs to perform multiple cache maintenance operations, it can identify that to the cache by issuing a multi-transaction request as the snoop request to the relevant cache. This can enable some optimisation of the handling of the cache maintenance operations within the cache, as will be discussed for example later with reference to FIGS. 12 and 13.

The various snoop responses will be returned back to the request distribution circuitry and then forwarded on to tracking circuitry 435 which is responsible for providing progress information back to the master device 400 to enable the master device to determine when the multiple transactions (in this case multiple cache maintenance operations) have been performed. In situations where a particular cache maintenance operation needs performing within multiple of the caches, the tracking circuitry will monitor the responses from each of the caches, and only treat the particular transaction as having been completed once all of the snoop responses have been received.

The tracking circuitry 435 can be arranged to keep track of performance of all of the transactions specified in the multi-transaction request, and then send a single notification back to the master device 400 when all of the required cache maintenance operations have been performed. Alternatively, it can provide the progress information in a more piecemeal manner, for example by issuing a series of count values back to the master device 400 as blocks of transactions, or individual transactions, are dealt with. The master device 400 can then merely accumulate the various count values in order to determine when all of the transactions specified in the multi-transaction request have been dealt with.

It will be appreciated that with local caches 412, 422, the contents will vary dynamically over time, and the snoop filter 445 provides an efficient mechanism for keeping track of addresses associated with entries within each cache, and accordingly indicating whether a snoop request will be necessary or not. For shared caches 450, 452, it is often the case that different address ranges are associated with the different caches, and accordingly there is a more static relationship between cache and the address of data stored therein. In such an arrangement, the request distribution circuitry 440 may have access to some static mapping information in relation to the shared caches 450, 452, in order to determine for any particular transaction which of the shared caches needs a snoop request issuing to it.

Whilst a single snoop circuit could be provided, in one embodiment multiple snoop circuits 430, 460 are provided, each snoop circuit being associated with a different address range. In such an embodiment, first stage request distribution circuitry 470 may be provided for referencing information about the address ranges associated with each snoop circuit in order to determine, for each transaction specified by the multi-transaction request, which snoop circuit should receive and process the associated transaction. This may result in a subset of the transactions being forwarded to the snoop circuit 430 and a different subset being routed to the snoop circuit 460. Each of the snoop circuits may then be arranged to receive a modified multi-transaction request from the first stage request distribution circuitry 470, identifying the various transactions to be processed by that snoop circuit. In such embodiments, each snoop circuit will have separate tracking circuitry 435, which will each independently provide progress information back to the master device 400. The master device 400 can then monitor the progress information provided from each of the tracking circuits in order to determine when all of the transactions associated with the multi-transaction request have been processed.

It is worth noting that, unlike the earlier discussed embodiments, for a multi-transaction request specifying a series of cache maintenance operations, the master device 400 will not typically need to know on a transaction-by-transaction basis which transactions have been performed. Instead, it only needs to know when the cache maintenance operations have been completed. Accordingly, it is typically only necessary for the progress information passed back to the master device to be sufficient for the master device to determine when all of the cache maintenance operations have been performed, and there is no need for the information to include unique transaction identifier information to identify the individual transactions to the master device 400.

FIG. 11B shows an optimisation that can be made to the configuration of the snoop filter to assist in the handling of the multiple cache maintenance operations specified by a multi-transaction request. In this embodiment, each entry 525 in the snoop filter 520 has a field 530 storing a slightly shorter tag portion than that stored in the field 507 of the example of FIG. 11A, accordingly this shorter tag portion matching with multiple cache lines. A single lookup can then be performed in respect of each entry 525, and in the event that the corresponding shortened tag portion of the transaction matches the tag portion stored in the field 530, then the relevant information in all of the various fields 532, 534, 536 can be used to identify which caches need to be snooped in respect of the cache lines associated with those fields. By being able to associate multiple cache lines with a single entry, this can significantly improve the efficiency of the access to the snoop filter by reducing the number of lookups required in order to process the full range of addresses covered by the multi-transaction request.

Figure 13:
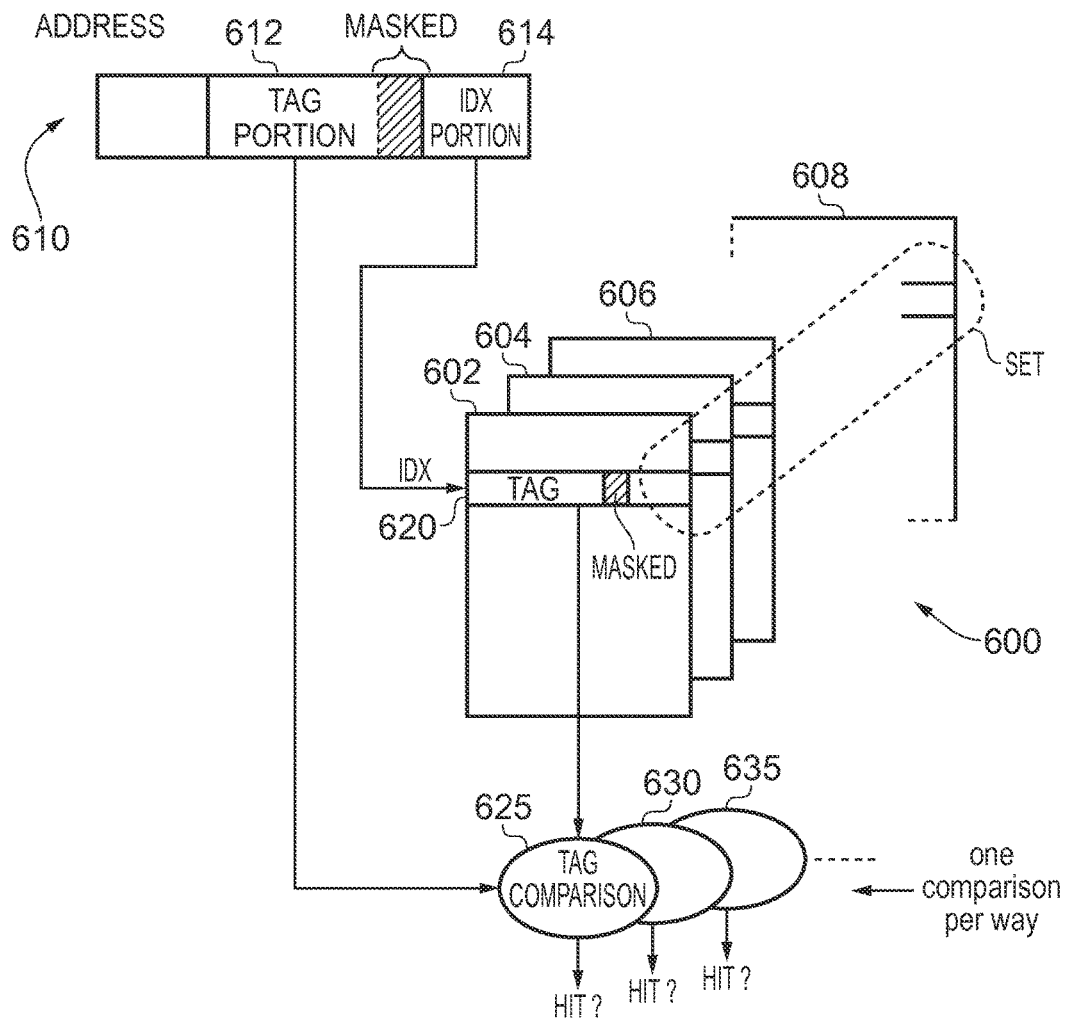
FIG. 13 schematically illustrates how the masking discussed in FIG. 12 is performed in accordance with one embodiment.

Often, the snoop filter 445 will have the same basic structure as the caches, and accordingly may be arranged as an N-way set associative storage structure, such as shown by the element 600 in FIG. 13. Each of the ways 602, 604, 606, 608 will include a plurality of entries, the entries storing a tag portion and some associated information. Within the snoop filter, the associated information will be that shown in FIG. 11A or 11B, namely identifying the caches that need to be snooped if a match is detected with the tag portion stored in the entry. For the caches themselves, the associated information will include valid and dirty control data. In addition, it will be appreciated that in the caches, for each tag entry, there will be a corresponding cache line storing a plurality of data values that will be accessed if a match is found between the tag portion of a transaction address and the tag portion stored in the entry 620.

As shown in FIG. 13, for an address under consideration 610, an index portion 614 of the address will be used to identify a particular set within the N-way set associative storage structure, and the tag information will then be output from each entry in the set to corresponding tag comparison blocks 625, 630, 635, there being one tag comparison block for each way in the N-way set associative structure. The output tag information will then be compared with the tag portion 612 of the address 610 in order to determine whether there is a hit. If there is, then if the lookup is being performed in the snoop filter, the associated information with the entry will identify the caches that need to be snooped. If instead the lookup is being performed within one the caches, then in the event of a hit, this will identify the cache line that needs to be subjected to the cache maintenance operation.

Figure 12:
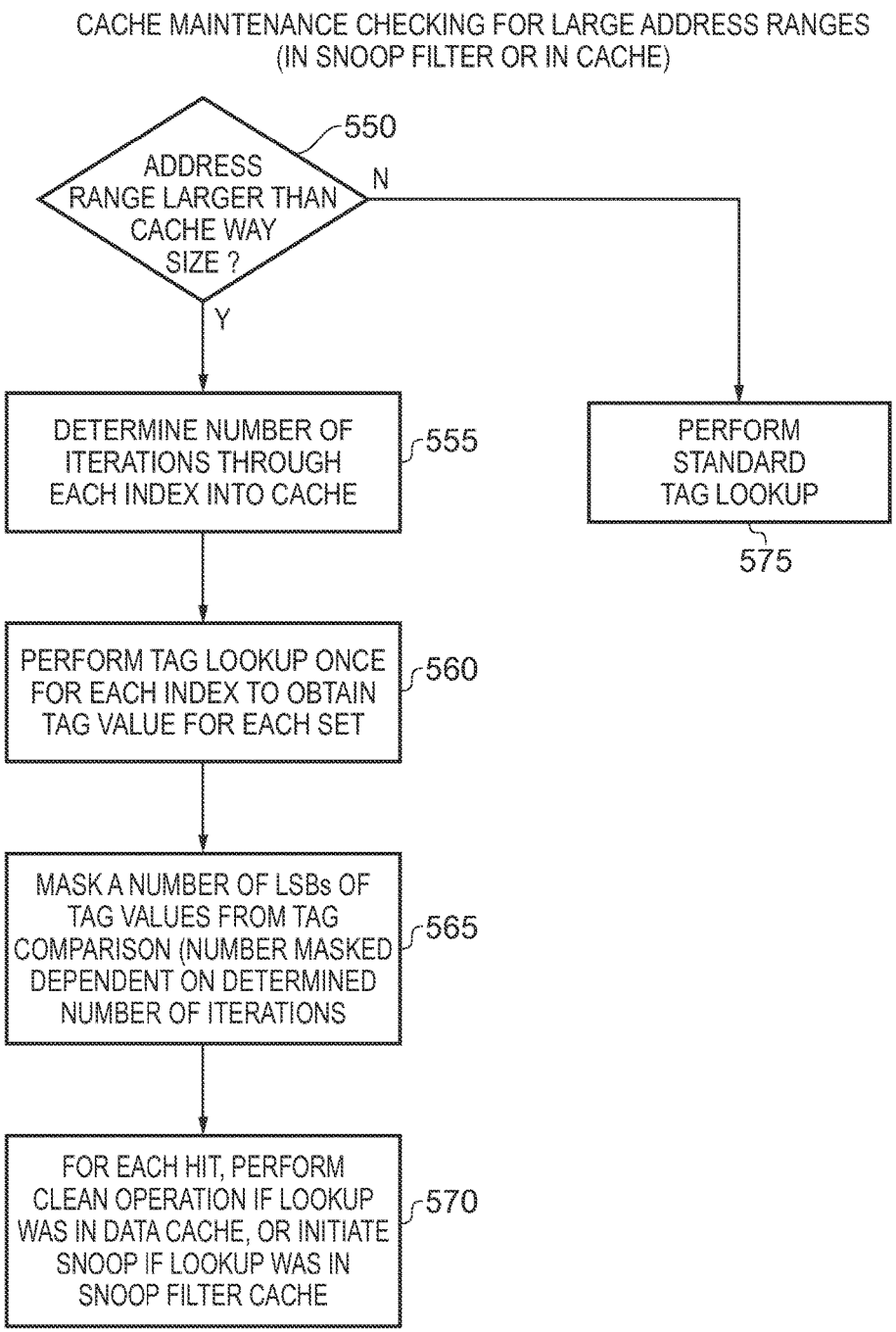
FIG. 12 is a flow diagram illustrating an optimisation that may be performed within either the snoop filter lookup or the cache lookup within the system of FIG. 10, in accordance with one embodiment.

FIG. 12 is a flow diagram illustrating an optimisation that can be employed either in the snoop filter 445 or in any of the caches, in the event of a multi-transaction request being directed to those elements, where the address range covered by the multi-transaction request is larger than the size of a cache way. If an address range is not larger than the cache way size then the process merely proceeds to step 575 where the standard tag lookup process is performed. However, if the address is larger than the cache way size, then the process proceeds to step 555, where it is determined how many iterations through each index into the cache would be necessary in order to service all of the transactions. Then, instead of iterating through each index multiple times, the process instead proceeds to step 560 where the tag lookup is performed once for each index in order to obtain the corresponding tag value for each set at that index location. Thereafter, at step 565, a number of least significant bits of each tag value are masked from the tag comparison, with the number of bits masked depending on the number of iterations determined at step 555. For example, if it was determined that eight iterations through each index would be required, then the least significant three bits of the tag value would be masked. More generally, if the number of iterations required is a power of two then a simple bit mask can be used. For other iterations more complex techniques can be used.

Further, as shown in FIG. 13, an equivalent number of bits from the tag portion 612 of the address 610 are masked, so that each tag comparison block 625, 630, 635 performs the tag comparison based on the masked tag information. In the event of a hit being detected in any of the ways, then the clean operation is performed on the corresponding cache line if the lookup was being performed in one of the data caches 412, 422, 450, 452, or if instead the lookup was being performed in the snoop filter cache, then this will trigger a snoop request to be issued to each of the caches identified by the associated control information in the snoop filter entry.

In embodiments where the snoop filters work on physical address, it will be appreciated that any large virtual address operations may need to be broken down into page sized operations, as a result limiting the size of the multi-transaction request that can be issued from the master device in such situations.

As an example of the benefits that can be realised by the approach described with reference to FIGS. 12 and 13, let us consider as an example an eight-way 256 kB cache. If each of the lines is 64 bytes, then the total cache will have 4 k lines and there will be 512 sets. Accordingly, if a 4 MB clean operation needs to be performed, then without the use of the approach of FIGS. 12 and 13, this would require 64 k checks to be performed, with repeated lookup operations being performed in respect of each index during the performance of the 4 MB clean. However, through use of the approach of FIGS. 12 and 13, each of the entries is only checked once, and accordingly there will be 512 checks performed rather than 64 k checks. Each check will effectively be covering 128 addresses so 7 bits of the address are masked for the tag check.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:
1. A data processing system comprising:
a master device;
a plurality of slave devices;
interconnect circuitry configured to couple the master device with said plurality of slave devices to enable transactions to be performed by said plurality of slave devices upon request from the master device;

the master device being configured to issue a multi-transaction request identifying multiple transactions to be performed, the multi-transaction request providing a base transaction identifier, a quantity indication indicating a number of transactions to be performed, and address information;

the interconnect circuitry including request distribution circuitry configured to analyse the address information and the quantity indication in order to determine, for each of the multiple transactions, the slave device that is required to perform that transaction, and further configured to issue transaction requests to each determined slave device to identify the transactions amongst said multiple transactions to be performed by that determined slave device;

each determined slave device being configured to provide a response to the master device to identify completion of each transaction performed by that determined slave device, each determined slave device being configured to provide its responses independently of the responses from any other determined slave device, and each response including a transaction identifier determined from the base transaction identifier and transaction specific information to enable the master device to identify completion of each transaction identified within the multi-transaction request.

2. A data processing system as claimed in claim 1, wherein the transaction requests issued by the request distribution circuitry include at least one multi-transaction request, each of said at least one multi-transaction requests identifying a plurality of said multiple transactions that are required to be performed by the determined slave device to which that multi-transaction request is issued.

3. A data processing system as claimed in claim 1, wherein the multi-transaction request issued by the master device is a multi-burst transaction request, and each of said multiple transactions is a burst transaction specifying a plurality of data transfers to be performed between the master device and the determined slave device for that burst transaction.

4. A data processing system as claimed in claim 1, wherein said address information comprises a base address, and the address for each transaction identified by the multi-transaction request is determined with reference to the base address.

5. A data processing system as claimed in claim 4, wherein each said multi-transaction request identifies a series of transactions relating to predetermined addresses within a contiguous address range.

6. A data processing system as claimed in claim 1, further comprising:
at least one further master device having a cache storage in which data is cached for access by said at least one further master device;
the interconnect circuitry comprising snoop circuitry responsive to a received transaction request to perform a snoop operation in respect of said cache storage based on an address specified for the transaction associated with the received transaction request, in order to determine whether data at that address is stored within the cache storage;
the request distribution circuitry further being configured to analyse the address information and the quantity indication in order to determine whether any of the multiple transactions specify an address which requires a snoop operation to be performed by the snoop circuitry;
the request distribution circuitry being responsive to determining that at least one of the multiple transactions requires a snoop operation to be performed, to split the multi-transaction request received from the master device into a plurality of transaction requests, and to issue at least one of the transaction requests to the snoop circuitry.

7. A data processing system as claimed in claim 1, wherein said plurality of slave devices include a plurality of memory controllers coupled to associated memory devices.

8. A data processing system as claimed in claim 1, wherein:
the multi-transaction request issued by the master device identifies multiple write transactions requiring write data to be written from the master device to the determined slave device for each write transaction;
the interconnect circuitry includes write data routing circuitry configured to route the write data for each of the multiple write transactions to the determined slave device for each write transaction; and
the master device is configured to delay output of the write data through the write data routing circuitry for each transaction until the determined slave device for that transaction issues a request for the write data.

9. A data processing system as claimed in claim 1, wherein the interconnect circuitry further comprises:
response routing circuitry configured to route to the master device the responses issued by each slave device during performance of the multiple transactions; and
contention mitigation circuitry associated with the request distribution circuitry and configured on determination that the request distribution circuitry is to split the multi-transaction request into a plurality of transaction requests issued to different slave devices, to apply a contention reduction measure in respect of the plurality of transaction requests in order to seek to reduce contention within the response routing circuitry due to responses being returned through the response routing circuitry from different slave devices.

10. A data processing system as claimed in claim 1, wherein the multi-transaction request identifies multiple write transactions requiring write data to be written from the master device to the determined slave device for each write transaction, and the multi-transaction request includes a field which identifies the write data value to be written for each transaction.

11. A data processing system as claimed in claim 1, wherein the multi-transaction request identifies multiple read transactions to be performed, and further specifies a write address indication used to identify an address at which each read data value should be written, thereby allowing data to be read from one address and then written to another address without separate write transaction requests being issued.

12. A data processing system as claimed in claim 1, wherein:
the master device is configured to issue a multi-transaction read request followed by an associated multi-transaction write request; and
the request distribution circuitry being configured to be responsive to the multi-transaction read request and associated multi-transaction write request to issue transaction requests to each determined slave device so as to cause data to be read from one address and then written to another address.

13. A data processing system as claimed in claim 4, wherein said multi-transaction request comprises mask information which is used in combination with the base address to determine the address for each transaction identified by the multi-transaction request.

14. A data processing system as claimed in claim 4, wherein when a slave device provides a response for a particular transaction, the transaction specific information used in combination with the base transaction identifier by that slave device to generate the transaction identifier included in the response comprises a number of bits of the address specified for the transaction.

15. A data processing system as claimed in claim 6, wherein at least one of the transaction requests issued to the snoop circuitry comprises a multi-transaction request identifying a plurality of said multiple transactions for which a snoop operation is required to be performed.

16. A data processing system as claimed in claim 6, wherein said snoop circuitry comprises a plurality of snoop circuits, each snoop circuit being associated with a different address range, and the request distribution circuitry being configured to issue separate transaction requests to each snoop circuit.

17. A data processing system as claimed in claim 6, wherein said snoop circuitry comprises a snoop filter configured to maintain address indications of addresses for which data is stored in the cache storage, and the snoop operation performed for a transaction comprises referencing the snoop filter using the address specified by the transaction, and issuing a snoop request to the cache storage if the snoop filter indicates that the address matches one of the address indications maintained by the snoop filter.

18. A data processing system as claimed in claim 7, wherein:
each associated memory device is configured to store data associated with a pattern of addresses, the pattern of addresses of one memory device being interleaved with the pattern of addresses of another memory device; and
the request distribution circuitry is configured to split the multi-burst transaction request into separate multi-burst transaction requests to be issued to each memory controller in order to cause each memory controller to perform the transactions amongst said multiple transactions whose specified addresses are within the pattern of addresses of the associated memory device.

19. A data processing system as claimed in claim 8, further comprising a handshake mechanism between each determined slave device and the master device via which each determined slave device issues said request for the write data.

20. A data processing system as claimed in claim 8, wherein the master device comprises a cache storage in which said write data is stored, and the request for the write data issued by the determined slave device is configured to cause the required write data to be evicted from the cache storage.

21. A data processing system as claimed in claim 9, wherein said contention reduction measure comprises allocating each of the different slave devices different time slots within the response routing circuitry.

22. A data processing system as claimed in claim 9, wherein said contention reduction measure comprises providing in association with each transaction request issued by the request distribution circuitry a data rate indication restricting a data rate employed by the determined slave device.

23. A data processing system as claimed in claim 12, wherein the associated multi-transaction write request is configured to specify the same base transaction identifier as used for the multi-transaction read request in order to enable the request distribution circuitry to identify the associated multi-transaction write request as being associated with the multi-transaction read request.

24. A data processing system as claimed in claim 18, wherein each of said memory controllers is provided with control data used by the memory controller to identify which transactions require performing by that memory controller.

25. A data processing system as claimed in claim 24, wherein the request distribution circuitry encodes said control data into the multi-transaction request issued to each memory controller.

26. Interconnect circuitry for interconnecting a master device and a plurality of slave devices to enable transactions to be performed by said plurality of slave devices upon request from the master device, comprising:
a master interface configured to receive from the master device a multi-transaction request identifying multiple transactions to be performed, the multi-transaction request providing a base transaction identifier, a quantity indication indicating a number of transactions to be performed, and address information;
request distribution circuitry configured to analyse the address information and the quantity indication in order to determine, for each of the multiple transactions, the slave device that is required to perform that transaction, and further configured to issue transaction requests to each determined slave device to identify the transactions amongst said multiple transactions to be performed by that determined slave device; and
response routing circuitry configured to route to the master device a response provided from each determined slave device to identify completion of each transaction performed by that determined slave device, each determined slave device providing its responses independently of the responses from any other determined slave device, and each response including a transaction identifier determined from the base transaction identifier and transaction specific information to enable the master device to identify completion of each transaction identified within the multi-transaction request.

27. A method of performing transactions within a data processing system comprising a master device, a plurality of slave devices, and interconnect circuitry coupling the master device with said plurality of slave devices to enable said transactions to be performed by said plurality of slave devices upon request from the master device, the method comprising:
issuing from the master device a multi-transaction request identifying multiple transactions to be performed, the multi-transaction request providing a base transaction identifier, a quantity indication indicating a number of transactions to be performed, and address information;
analysing within the interconnect circuitry the address information and the quantity indication in order to determine, for each of the multiple transactions, the slave device that is required to perform that transaction, and issuing transaction requests to each determined slave device to identify the transactions amongst said multiple transactions to be performed by that determined slave device; and issuing to the master device from each determined slave device a response to identify completion of each transaction performed by that determined slave device, each determined slave device providing its responses independently of the responses from any other determined slave device, and each response including a transaction identifier determined from the base transaction identifier and transaction specific information to enable the master device to identify completion of each transaction identified within the multi-transaction request.

28. A data processing system comprising:

a master means;

a plurality of slave means;

interconnect means for coupling the master means with said plurality of slave means to enable transactions to be performed by said plurality of slave means upon request from the master means;

the master means for issuing a multi-transaction request identifying multiple transactions to be performed, the multi-transaction request providing a base transaction identifier, a quantity indication indicating a number of transactions to be performed, and address information;

the interconnect means including request distribution means for analysing the address information and the quantity indication in order to determine, for each of the multiple transactions, the slave means that is required to perform that transaction, and further for issuing transaction requests to each determined slave means to identify the transactions amongst said multiple transactions to be performed by that determined slave means;

each determined slave means for providing a response to the master means to identify completion of each transaction performed by that determined slave means, each determined slave means for providing its responses independently of the responses from any other determined slave means, and each response including a transaction identifier determined from the base transaction identifier and transaction specific information to enable the master means to identify completion of each transaction identified within the multi-transaction request.

* * * * *